United States Patent [19]
Takagi et al.

[11] Patent Number: 4,592,990
[45] Date of Patent: Jun. 3, 1986

[54] PROCESS FOR PRODUCING TONER

[75] Inventors: Seiichi Takagi, Tokyo; Yoshihiko Hyosu, Sagamihara; Masumi Sasakawa, Tokyo, all of Japan

[73] Assignee: Canon Kabushiki Kaisha, Tokyo, Japan

[21] Appl. No.: 563,828

[22] Filed: Dec. 21, 1983

[30] Foreign Application Priority Data

| Dec. 29, 1982 | [JP] | Japan | 57-231528 |
| Dec. 29, 1982 | [JP] | Japan | 57-231529 |
| Dec. 29, 1982 | [JP] | Japan | 57-231530 |
| Feb. 18, 1983 | [JP] | Japan | 58-25652 |
| Feb. 18, 1983 | [JP] | Japan | 58-25653 |
| Feb. 18, 1983 | [JP] | Japan | 58-25654 |
| Feb. 18, 1983 | [JP] | Japan | 58-25655 |
| Feb. 18, 1983 | [JP] | Japan | 58-25656 |
| Feb. 18, 1983 | [JP] | Japan | 58-25657 |
| Feb. 18, 1983 | [JP] | Japan | 58-25658 |
| Feb. 18, 1983 | [JP] | Japan | 58-25659 |
| Feb. 18, 1983 | [JP] | Japan | 58-25660 |

[51] Int. Cl.$^4$ ............................................. G03G 4/00
[52] U.S. Cl. .................................. 430/137; 430/138; 430/109; 430/106.6; 526/201; 524/460; 427/213.34
[58] Field of Search .................. 430/137; 526/201; 524/460; 427/213.34

[56] References Cited

U.S. PATENT DOCUMENTS

| 3,720,617 | 3/1973 | Chatterga et al. | 430/110 |
| 3,959,153 | 5/1976 | Sadamatsu et al. | 430/137 |
| 3,983,045 | 9/1976 | Jugle et al. | 430/110 |
| 3,997,488 | 12/1976 | Tsubuko et al. | 430/137 X |
| 4,100,087 | 7/1978 | Takayama et al. | 430/137 X |
| 4,231,919 | 11/1980 | Isaacson | 430/137 X |
| 4,386,147 | 5/1983 | Seimiga | 430/109 X |

*Primary Examiner*—John D. Welsh
*Attorney, Agent, or Firm*—Fitzpatrick, Cella, Harper & Scinto

[57] ABSTRACT

A process for producing toner, which comprises dispersing a monomer system comprising a polymerizable monomer and a polar polymer in a dispersion medium containing a dispersant having a charging polarity opposite to that of said polar polymer, and subjecting said monomer system to the suspension polymerization. By this process, toner particles excellent in fixing characteristic, developing characteristic and abrasion resistance can be obtained with a narrow particle size distribution.

22 Claims, No Drawings

PROCESS FOR PRODUCING TONER

BACKGROUND OF THE INVENTION

1. Field of the Invention

This invention relates to a process for producing a toner for developing electrostatically charged images.

2. Description of the Prior Art

Heretofore, toners have been manufactured generally by fusion mixing of colorants and other additives into thermoplastic resins to disperse them uniformly therein, followed by pulverization and classification into desired particle sizes by means of a micropulverizing device and a classifier. This preparation method is capable of producing considerably excellent toners, but limited in certain respects. More specifically, in the process for producing toners by pulverization, the material must be fragile so as to be readily pulverized to a certain extent. However, if the material is too fragile, it may be excessively micropulverized, and therefore micropulverized portion of the particles thus obtained must be uneconomically removed in order to obtain a suitable distribution of particles, resulting in increased production cost of the toner. Moreover, such a toner may be sometimes further subject to micropulverization in copying machines. If a material with a low melting point or a pressure fixing material is employed to improve heat fixing characteristic of the toner, fusion of such a material may occur in the pulverizing device or the classifier, whereby continuous production of the toner may sometimes be rendered impossible. Other requisite conditions for toners are to have triboelectric charging characteristic suitable for development, to be capable of forming excellent images, to be stable in performance after storage, to be free from agglomeration such as blocking, to have a suitable heat or pressure fixing characteristic, to effect no contamination on a photosensitive member and so on.

Accordingly, in order to remove the drawbacks of the pulverization method, there have been proposed processes for producing toners through suspension polymerization. According to these processes, since no pulverization step is included, no fragility is necessary for the material and spherical shapes of the toner obtained are suitable for giving excellent free flowing property, and it is also possible to obtain toners excellent in heat or pressure fixing characteristic by controlling polymerization adequately, by use of a crosslinking agent, etc. or by incorporating some additive in the material.

However, it is technically difficult to conduct polymerization in a stable suspension system without any coalescence and to obtain fine polymer particles with a uniform distribution of particle diameters.

Accordingly, in order to prevent the polymer particles from coalescing as the polymerization proceeds, suspension stabilizers are used when the suspension polymerization of a polymerizable monomer system is carried out in water. The suspension stabilizers generally include finely divided, barely soluble inorganic compounds such as barely soluble salts, for example, $BaSO_4$, $CaSO_4$, $MgCO_3$, $BaCO_3$, $CaCO_3$, and $Ca_3(PO_4)_2$; inorganic polymers such as diatomaceous earth, silicic acid and talc; powders of metal oxides; and water-soluble polymers such as polyvinyl alcohol, gelatin, starches and the like.

Stirring also affects stability of polymerization and particle size. High speed stirring makes polymerization stable, but the size of particles obtained will be smaller than the desired size. On the contrary, low speed stirring may result in gelation of the reaction system, so that particles may not be formed. Therefore it is necessary to select suitable conditions.

However, even by these methods, it is difficult to obtain polymer particles with satisfactory sizes as toner, that is, minute particles with a number average size of about $10\mu$–$20\mu$. This is because coalescence cannot sufficiently be prevented according to the methods of the prior art. Accordingly, there has been proposed a method using a combination of a polymerizable monomer and an inorganic dispersant which have mutually opposite charging polarities (Japanese Laid-open Patent Application No. 110945/1981). According to this method, the surfaces of polymerizable monomer particles are cationically (or anionically) charged by use of a cationic polymerizable monomer (or an anionic polymerizable monomer) or by addition of hardly soluble organic amine compounds, while the inorganic dispersant is anionically (or cationically) charged to the contrary, whereby the inorganic dispersant completely covers the surfaces of the polymerizable monomer particles uniformly by strong ionic bonding to prevent coalescence of the polymer so that fine particles with a number average size of about 10 to $20\mu$ may be produced. However, the sizes of the particles produced according to these methods are not yet sufficiently satisfactory as toner. The distribution of particle sizes should desirably be as narrow as possible. In other words, if the particle sizes are more uniform, charges on individual particles will become substantially the same, so that images can be formed stably. As the distribution of particle sizes is made narrower, the images will be more stably formed, with improves reproducibility of fine lines without fog.

While not intended to be bound by any theory, sufficiently narrow particle size distribution cannot be obtained in the above-mentioned method, because cationic or anionic monomers, when added into a monomeric system, tend to gather at the surfaces of suspended particles, and slightly diffuse from the monomeric system to the dispersing medium whereby distinct interface between particles is not ensured and suspension of particles becomes slightly unstable.

Further, it is very difficult for the toner prepared according to the method as mentioned above to satisfy the antagonistic requirements of having good heat fixing characteristic and of having good anti-blocking characteristic as well as good developing characteristic. To improve heat fixing characteristic, it is needed to lower the melting temperature or glass transition temperature Tg of the polymerized resin, which, however, is disadvantageous to anti-blocking characteristic. To improve anti-blocking characteristic, at least Tg of the polymer must be raised up to a required non-blocking temperature or higher, higher Tg being still more advantageous.

However, if Tg of the toner prepared by this method is lowered to improve heat fixing characteristic by decreasing the molecular weight of the polymer, the anti-blocking characteristic will become worse because the toner is constituted of a substantially homogeneous polymer as a whole in spite of the presence of cationic (or anionic) groups gathering at the particle surfaces. This will in turn be reflected on development to worsen the quality of images; and vice versa, namely, if the polymer is made to have higher molecular weight or crosslinked to improve anti-blocking characteristic, heat fixing characteristic will become worse.

SUMMARY OF THE INVENTION

An object of the present invention is to provide a process for producing a toner by suspension polymerization by which the problems of the prior art described above have been solved.

A specific object of the invention is to provide a process for producing a toner with a low heat fixing temperature and good anti-blocking characteristic.

Another specific object of the invention is to provide a process for producing a toner with good pressure fixing characteristic and good anti-blocking characteristic.

A further object of the invention is to provide a process for producing a toner excellent in developing characteristic for developing electrostatic images.

Still further object of the invention is to provide a toner excellent in abrasion resistance for developing electrostatic images and a process for producing the same.

The process of the present invention has been developed in order to achieve the objects set forth above and comprises dispersing a monomer system comprising a polymerizable monomer and a polar polymer in a dispersion medium containing a dispersant having a charging polarity opposite to that of said polar polymer, and subjecting said monomer system to the suspension polymerization.

The reason why the employment of the polar polymer, i.e., cationic or anionic polymer in place of the polar monomer, i.e., cationic or anionic monomer according to the present invention provides good results has not been fully clarified so far, but it may be speculated as follows. That is to say, in place of the polar monomer, a polar (i.e., cationic or anionic) polymer already provided with a high molecular weight is added in the monomer system in the present invention, and therefore the polar polymer having gathered at the surfaces of the suspended particles is not partitioned from the monomer system into the suspension medium system at all. As the result, the interface of the suspended particles can be distinctly defined and stabilized, whereby particles sizes will become more uniform.

Further, since the polar polymer gathers around the surfaces of the suspended particles in the form like a kind of shell, the resultant particles are shaped in pseudo-capsules. More specifically, any resin with desired polymerization degree can be used for the polar polymer forming the shell independently of the polymerization of the starting polymerizable monomer. Accordingly, the inner portion of the capsule can be polymerized to form a relatively low molecular weight polymer excellent in heat or pressure fixing characteristic, and on the other hand for the polar polymer forming the shell of the capsule can be used high molecular weight resins excellent in anti-blocking characteristic, developing characteristic and abrasion resistance.

DETAILED DESCRIPTION OF THE INVENTION

In the following description, "%" and "parts" representing proportional amounts are based on weight, unless otherwise specifically noted.

The polar polymer used in the invention is either a cationic polymer or an anionic polymer. Both polymers are not limited to homopolymers and may be copolymers. More specifically, the cationic polymer may be selected from homopolymers of cationic monomers as described below or copolymers of such cationic monomer and comonomers polymerizable therewith which are selected from the comonomer group described below. The anionic polymer may be selected from homopolymers of anionic monomers as described below or copolymers of such anionic monomers and comonomers polymerizable therewith which are selected from the comonomer group described below.

Cationic monomers

Nitrogen-containing monomers, such as dimethylaminoethyl methacrylate, dimethylaminoethyl acrylate, diethylaminoethyl methacrylate, diethylaminoethyl acrylate, N-n-butoxyacrylamide, trimethylammonium chloride, diacetone acrylamide, acrylamide, N-vinylcarbazole, vinylpyridine, 2-vinylimidazole, 2-hydroxy-3methacryloxypropyl trimethylammonium chloride, 2-hydroxy-3-acryloxypropyl trimethylammonium chloride or derivatives of these compounds obtained by quaternizing the nitrogen atoms therein.

Anionic monomers

Monomers containing hydroxyl group, carboxyl group, sulfonic acid group or acid anhydride, such as N-methylolacrylamide, methacrylic acid, acrylic acid, maleic acid, glycidyl methacrylate, polypropyleneglycol monomethacrylate, 2-acrylamido-2-methylpropane sulfonic acid, 2-hydroxyethyl methacrylate, 2-hydroxypropyl methacrylate, acid phosphoxyethyl methacrylate and others.

Comonomers

Styrenes such as styrene, o-methylstyrene, m-methylstyrene, p-methylstyrene, p-methoxystyrene, p-phenylstyrene, p-chlorostyrene, 2,4-dichlorostyrene, p-n-butylstyrene, p-tert-butylstyrene, p-n-hexylstyrene, p-n-octylstyrene, p-n-nonylstyrene, p-n-decylstyrene, p-n-dodecylstyrene, etc., and the derivatives thereof; ethylenically unsaturated monoolefines such as ethylene, propylene, butylene, isobutylene, etc.; vinyl halides such as vinyl chloride, vinylidene chloride, vinyl bromide, vinyl fluoride, etc.; vinyl esters such as vinyl acetate, vinyl propionate, vinyl benzoate, etc.; α-methylene aliphatic monocarboxylic acid esters such as methyl methacrylate, ethyl methacrylate, propyl methacrylate, n-butyl methacrylate, isobutyl methacrylate, n-octyl methacrylate, dodecyl mechacrylate, 2-ethylhexyl methacrylate, stearyl methacrylate, phenyl methacrylate, etc.; acrylic acid esters such as methyl aceylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, etc.; vinyl ethers such as vinyl methyl ether, vinyl ethyl ether, vinyl isobutyl ether, etc.; vinyl ketones such as vinyl methyl ketone, vinyl hexyl ketone, methyl isopropenyl ketone, etc.; N-vinyl compounds such as N-vinylpyrrole, N-vinylcarbazole, N-vinylindole, N-vinylpyrrolidone, etc.; vinylnaphthalenes; the derivatives of acrylic or methacrylic acid such as acrylonitrile, methacrylonitrile, acrylamide, etc.

If the polar polymer described above is a copolymer, the content of the polar monomer as a polymeric unit is preferably 0.5% or more, more preferably 2% or more. The molecular weight of the polar polymer is determined in view of fixing characteristics, anti-blocking characteristic, abrasion resistance and so on of the toner obtained and is preferably in the range of 5000 to 500,000.

The monomer system used in the invention is obtained by mixing a polymerizable or ethylenically unsaturated monomer with a colorant, a polymerization initiator, etc. The polymerizable monomer suitably used in the invention is one or more selected from the comonomer group described above for preparation of polar copolymers.

The above polar polymer is preferably used in an amount of 0.5 to 50 parts, more preferably to 30 parts with respect to 100 parts of these polymerizable monomers.

The polymerization initiator which may be used in the present invention can be freely selected from the compounds employed conventionally as vinyl polymerization initiators. The initiators include, for example, azobisisobutyronitrile (AIBN), benzoyl peroxide, methyl ethyl ketone peroxide, isopropyl peroxycarbonate, cumene hydroperoxide, 2,4-dichlorobenzoyl peroxide, lauroyl peroxide, and the like. Generally speaking, the amount of the initiator employed is about 0.1 to 10%, preferably 0.5 to 5%, of the total of the monomers and the polar polymer.

As the colorant, carbon black, dyes, pigments and the like as well as magnetic powders known in the art may be used. Such colorants may used in an amount of about 2 to 10 parts based on 100 parts of the total of the monomers and the polar polymer. And, the magnetic powder may be used in an amount of about 15 to 100 parts based on 100 parts of the total of the monomers and the polar polymer when a magnetic toner is prepared. Magnetic material employed may preferably be treated on its surface with a titanate coupling agent or saline coupling agent.

A crosslinking agent may also be permitted to be present in the monomer system to produce the toner in the form of a cross-linked polymer. The crosslinking agent preferably used may be selected from crosslinking agents conventionally used, for example, divinylbenzene, divinylnaphthlene and their derivatives; diethylenic carboxylic acid exters such as diethylene glycol methacrylate, triethylene glycol methacrylate, diethylene glycol dimethacrylate, tetroethylene glycol dimethacrylate, and the like. Such a crosslinking agent may be used in an amount preferably of 0.001 to 15% by weight, more preferably of 0.1 to 10% by weight, of the total of the monomer and the polar polymer.

A hardly water-soluble organic amine compound may be also added in the monomer system.

In order to improve fixing characteristic and off-set resistance of the toner produced according to the present invention, a hydrocarbon compound may be preferably added in the monomer system. While not intended to be bound by any theory, it appears that since the hydrocarbon compound used in the invention is hydrophobic and has a low molecular weight, it is hardly miscible with the polar polymer having polar groups and a high molecular weight, and therefore the hydrocarbon compound is not exposed on the surface of the toner but remains inside the toner. However, when the toner is subjected to fixation, the hydrocarbon comes out from the inside to the surface and improve fixing characteristic and off-set characteristic markedly. The hydrocarbon compound may be considered to serve as a plasticizer, a lubricant or an oil.

The hydrocarbons used in the invention are preferably paraffins, polyolefins and the like having six or more carbon atoms, for example, Paraffin wax (mfd. by Nihon Sekiyu K.K.), Paraffin wax (Nihon Seiro K.K.), Micro wax (Nihon Sekiyu K.K.), Microcrystalline wax (Nihon Seiro K.K.), PE-130 (Hoechst A.G.), Mitsui highwax 110P (Mitsui Sekiyu Kagaku K.K.), Mitsui highwax 220P (Mitsui Sekiyu Kagaku K.K.), Mitsui highwax 660P (Mitsui Sekiyu Kagaku K.K.) and the like. Paraffins are particularly preferred.

Such hydrocarbons are preferably used in an amount of 0.5 to 15 parts per 100 parts of the total of the monomer and the polar polymer.

Polymers other than the polar polymer described above may be also added in the monomer system of the invention, if desired.

The monomer system containing the components described above is subjected to suspension polymerization to produce the toner. For this purpose, the monomer system in which the components described above have been uniformly dissolved or dispersed is dispersed in a dispersion medium containing a dispersing agent, usually of an aqueous continuous phase, by means of a conventional stirrer, homo-mixer, homogenizer or the like.

Preferably, stirring speed and time should be controlled so that the droplets of the monomers may have sizes of $30\mu$ or less, which are as small as the desired toner particle sizes, and thereafter stirring may be conducted to the extent, until the completion of the polymerization, such that sedimentation of the particles may be prevented so as to maintain substantially the above-mentioned states through the action of a dispersion stabilizer. The polymerization temperature is generally not lower than 50° C., preferably about 70° to 90° C.

According to the present invention, as the dispersant, dispersants having a charging polarity opposite to that of the polar polymer contained in the monomer system, i.e., anionic dispersants or cationic dispersants are employed.

The anionic dispersant to be used in combination with the cationic polymer may be selected from the anionic dispersants known in the art, for example, water-soluble polymers such as partially saponified polyvinyl acetates and partially saponified products of copolymers of vinyl acetate, and finely divided inorganic compounds such as colloidal silica, e.g., Aerosil #200 and #300 produced by Nihon Aerosil K.K.

The cationic dispersants to be used in combination with the anionic polymer include aluminum oxide and positively charged hydrophilic colloidal silica treated with silane treating agents containing a nitrogen-containing group such as an amino group.

These dispersants are used in such an amount as to suspend the above-described monomers stably in a dispersion medium such as water, etc., preferably in an amount ranging from about 0.1 to 10% by weight, particularly 0.2 to 5% by weight, of the dispersion medium.

The polymer particles obtained through the suspension polymerization described above are washed with water and then recovered by a suitable method such as filtration, decantation, centrifugation, etc., and thereafter the particles are dried to obtain a toner.

The toner thus obtained is excellent in fixing characteristic, anti-blocking characteristic and charging characteristic, and therefore it gives good quality of images. In particular, the toner can be satisfactorily used under normal or low humidity conditions. However, the hydrophilic dispersant used in the suspension polymerization cannot be removed by simple washing procedures and therefore remains attached on the surfaces of the toner particles and makes them somewhat hygroscopic. As the result, the toner has a drawback that the its charging characteristics are made unstable under high humidity conditions, and therefore the developing characteristic thereof become bad.

In order to remove hygroscopicity due to such surface attachment of the dispersant and the drawbacks caused thereby, it is preferred to treat the polymer particles after the suspension polymerization with a silane coupling agent or a titanate coupling agent or with alkali. The treatment with the coupling agents prevents association of hydrophilic groups in the dispersant with water through coupling of the hydrophilic groups. The treatment with alkali removes hygroscopicity by accelerating the elimination of the dispersant from the toner particles. Both treatments may be employed in combination. In that case, the alkali treatment is preferably conducted before the treatment with the coupling agents.

The silane coupling agents used in the invention include vinyl trichlorosilane, vinyl trimethoxysilane, vinyl triethoxysilane, vinyl tris(2-methoxyethoxy)silane, vinyl triacetoxysilane, N-$\beta$(aminoethyl)-$\gamma$-aminopropyl methoxysilane, N-$\beta$(aminoethyl)-$\gamma$-aminopropyl methyl dimethoxysilane, N-$\beta$(N-vinylbenzylaminoethyl)-$\gamma$-aminopropyl trimethoxysilane, $\gamma$-aminopropyl triethoxysilane, $\gamma$-(2-aminoethyl)aminopropyl trimethoxysilane, methyl trimethoxysilane, methyl triethoxysilane, methyl trichlorosilane, $\gamma$-methacryloxypropyl trimethoxysilane, $\gamma$-glycidoxypropyl trimethoxysilane, $\gamma$-mercaptopropyl trimethoxysilane, vinyl triacetoxysilane, $\gamma$-chloropropyl trimethoxysilane, hexamethyldisilane, vinyl tris(methoxyethoxy)silane, $\gamma$-anilinopropyl trimethoxysilane, octadecyl dimethyl 3-(trimethoxysilyl)propylammonium chloride, $\gamma$-mercaptopropyl methyl dimethoxysilane and the like.

The titanate coupling agents used in the invention include isopropyl triisostearoyl titanate, isopropyl tridodecylbenzenesulfonyl titanate, isopropyl tris(dioctyl pyrophosphate)titanate, tetraisopropyl bis(dioctyl phosphite)titanate, tetraisopropyl bis(ditridecyl phosphite)titanate, tetra(2,2-diallyloxymethyl-1-butyl)bis(ditridecyl)phosphite titanate, bis(dioctyl pyrophosphate)oxyacetate titanate, bis(dioctyl pyrophosphate)ethylene titanate, isopropyl trioctanoyl titanate, isopropyl dimethacryl isostearoyl titanate, isopropyl isostearoyl diacryl titanate and the like.

Treatment of the polymer particles with these coupling agents can be carried out by the conventional methods such as the method by dissolving or dispersing a coupling agent in an aqueous solution and then immersing the polymer particles therein; the method by dissolving a coupling agent in an organic solvent containing a small amount of water and a hydrolytic catalyst and then immersing the polymer particles therein; the method by spraying an aqueous or organic solution containing a coupling agent upon the polymer particles; and the like. But the methods of treatment are not limited to those mentioned above.

The amount of the coupling agent used is preferably 0.1% or more, more preferably 1% or more of the polymer particles. The amount should not be above 30%. The amount mentioned above can be reduced when the dispersant has been removed in advance by the alkali treatment.

On the other hand, the alkalis which can preferably be used in the invention include alkali hydroxides; potassium hydroxide, sodium hydroxide, calcium hydroxide, tetramethylammonium hydroxide and the like; and alkali carbonates; ammonium carbonate, potassium carbonate, sodium carbonate and the like. The alkali treatment is especially effective as a post treatment of the suspension polymerization using an inorganic dispersant and is carried out by adding the polymer in a strong alkaline aqueous solution containing 50% or more, preferably 120% or more based on the inorganic dispersant employed of an alkali whereby allowing the inorganic substance on the surface of the polymer to react with the alkali so as to be removed from the surface of the polymer and to be dissolved in the alkali solution. If the amount of the alkali is not more than 50%, the inorganic dispersant cannot sufficiently be removed but remains on the surface of the toner.

The toner obtained as described above may be applicable for all of the developing methods known in the art. For example, there may be employed two-component developing methods such as the cathode method, the magnetic brush method and the microtoning method, etc.; one component developing methods such as the electroconductive one component developing method, the insulating one component developing method and the jumping developing method, etc.; the powder cloud method and the fur brush method; the non-magnetic one component developing method in which the toner is caused to travel to the developing section by being held on a toner carrier through electrostatic force to be developed thereat.

The present invention will be specifically illustrated in more detail by way of the following examples and the comparative examples.

EXAMPLE 1A

| | |
|---|---|
| Styrene monomer | 200 g |
| Styrene-dimethylaminoethyl methacrylate copolymer | 10 g |
| (monomer weight ratio 8:2, $\overline{Mw}$ = 50,000) | |
| Azobisisobutyronitrile | 10 g |
| Phthalocyanine blue | 10 g |

The monomer system consisting of above ingredients was mixed in a vessel equipped with a high shearing force mixer (TK-homomixer produced by Tokushukika Kogyo K.K.) for about 5 minutes under heating at about 60° C. The styrene-dimethylethyl methacrylate copolymer had been previously dissolved in the styrene monomer, while warming at 60° C., before being mixed with the other ingredients.

Separately, 4 g of Aerosil #200 was dispersed in 1000 cc of water and the dispersion was warmed at 60° C. The monomer system described above was thrown into the dispersion under stirring by means of TK-homomixer, followed by stirring at 4000 rpm for about one hour. Thereafter, this mixture system was stirred by means of a paddle stirring blade to complete polymerization. Then, after removal of the dispersant, the resultant polymer was washed with water, filtered and dried to obtain a toner.

The toner obtained had a number average size of 9.05 $\mu$m, a number distribution in which particles of 6.35 $\mu$m or less comprised 17% and volume distribution in which particles of 20.2 μm or more comprised 1% (Coulter counter, aperture 100 μm).

The toner was mixed with iron powder carrier EFV 250/400 at a level of the toner content of 10 weight % and the triboelectric charge thereof was measured to be +10.4 μC/g. By use of this developing agent, reversal development was conducted by means of a copying machine (NP-5500 mfd. by Canon K.K.) As the result, good images were obtained. Moreover, when this toner was subjected to the blocking test at 50° C., no blocking occured at all after one week or longer.

COMPARATIVE EXAMPLE 1A

| Styrene monomer | 200 g |
|---|---|
| Dimethylaminoethyl methacrylate monomer | 2 g |
| Azobisisobutyronitrile | 10 g |
| Phthalocyanine blue | 10 g |

The above ingredients were mixed and suspension polymerization was carried out in the same manner as in Example 1 to obtain a toner.

The toner obtained had a number average size of 9.3 μm, a number distribution in which particles of 6.35 μm or less comprised 23% and a volume distribution in which particles of 20.2 μm or more comprised 5%. The triboelectric charge measured in the same manner as in Example 1 was nearly the same as in Example 1, i.e., +9.5 μC/g. However, is successive image formation, images became bad with formation of fog after about 5000 sheets of copying. In the blocking test at 50° C., blocking occurred in one night.

EXAMPLE 2A

| Styrene monomer | 180 g |
|---|---|
| Butyl acrylate monomer | 20 g |
| Styrene-diethylaminoethyl methacrylate copolymer | 10 g |
| (monomer ratio 9:1, $\overline{Mw}$ = 100,000) | |
| Azobisisobutyronitrile | 10 g |
| Magnetite | 120 g |
| (BL-250 produced by Titan Kogyo) | |
| Oxidized wax (ASA-30 produced by Mitsubishi Kasei K.K.) | 1 g |

The monomer system consisting of the above ingredients was subjected to suspension polymerization in the same way as in Example 1A to produce a toner.

The toner obtained had a number average size of 8.5 μm, a number distribution in which particles of 6.35 μm or less comprised 20% and a volume distribution in which particles of 20.2 μm or more comprised 0% (Coulter counter, aperture 100μ). This toner was charged in a copying machine (PC-10 produced by Canon Inc.), and image formation was effected. As the result, good images were obtained. Further, in successive image formation for 2000 sheets, resultant images were also good. In the blocking test at 50° C. for this toner, no blocking occurred for one week or longer.

COMPARATIVE EXAMPLE 2A

A toner was obtained in the same way as in Example 2A except that 1 g of diethylaminoethyl methacrylate monomer was employed in place of styrene-dimethylaminoethyl methacrylate copolymer.

The toner obtained had a number average size of 9.1 μm, a number distribution in which particles of 6.35 μm or less comprised 25% and a volume distribution in which particles of 20.2 μm or more comprised 5%. This toner was charged in a copying machine (PC-10), and image formation was effected. As the result, images with some fog were obtained. In successive image formations, fog on the sheets became increased after about 1000 sheets of copying to worsen images. In the blocking test at 50° C. for this toner, blocking occurred in three days.

EXAMPLE 3A

| Styrene monomer | 200 g |
|---|---|
| Copolymer of styrene and dimethylaminoethyl methacrylate quaternized by 5% with benzyl chloride | 10 g |
| (monomer ratio 9:1 $\overline{Mw}$ = 150,000) | |
| Azobisisobutyronitrile | 10 g |
| Phthalocyanine blue | 10 g |

The monomer system consisting of the above ingredients was subjected to suspension polymerization in the same way as in Example 1A to produce a toner.

The toner obtained had a number average size of 8.3 μm, a number distribution in which particles of 6.35 μm or less comprised 18% and a volume distribution in which particles of 20.2 μm or more comprised 0% (Coulter counter, aperture 100μ). By use of this toner, image formation was effected in the same manner as in Example 1A.

The triboelectric charge of the toner was +12.1 μC/g, and the images obtained were good. In successive image formation, images without fog were formed stably for 50,000 sheets.

Also, there was no problem in the blocking test at 50° C.

COMPARATIVE EXAMPLE 3A

| Styrene monomer | 200 g |
|---|---|
| Monomer of dimethylaminoethyl methacrylate quaternized by 5% with benzyl chloride | 1 g |
| Azobisisobutyronitrile | 10 g |
| Phthalocyanine blue | 10 g |

The monomer system consisting of the above ingredients was subjected to suspension polymerization in the same way as in Example 3A to produce a toner. The toner obtained had a number average size of 9.0 μm, a number distribution in which particles of 6.35 μm or less comprised 21% and a volume distribution in which particles of 20.2 μm or more comprised 6%. By use of this toner, image formation was effected in the same manner as in Example 3A.

The triboelectric charge of the toner was +11.0 μC/g. In successive image formation, some fog began to appear after 10,000 sheets of copying, and images became bad after 20,000 sheets of copying. In the blocking test at 50° C., blocking occurred in three days.

EXAMPLE 4A

| Styrene monomer | 200 g |
|---|---|
| Styrene-dimethylaminoethyl methacrylate copolymer | 10 g |
| (monomer ratio 8.5:5, $\overline{Mw}$ = 150,000) | |
| 2,2'-azobis-(2,4-dimethylvalero- | 10 g |

-continued

| | |
|---|---|
| nitrile) (V-65, product of Wako-juntaku Kogyo K.K.) | |
| Phthalocyanine blue | 10 g |
| Divinylbenzene | 1.0 g |

A toner was prepared from the above monomer system in the same manner as in Example 1A. The toner obtained had a number average size of 8.7 μm, a number distribution in which particles of 6.35 μm or less comprised 17% and a volume distribution in which particles of 20.2 μm or more comprised 1% (Coulter counter, aperture 100 μm).

Image formation was carried out by the method of conveying the toner to a developing section where it is to be held on the toner bearing member by electrostatic force for development. As the result, good image were obtained. In successive image formation, images were formed stably for 20,000 sheets of copying. Moreover, this toner had no problem in the brocking test at 50° C., and it showed good fixing characteristics in the system applied with silicone oil of a fixing device at 160° C. without the problem of off-set.

COMPARATIVE EXAMPLE 4A

A toner was obtained in the same way as in Example 4A except that 1.5 g of dimethylaminoethyl methacrylate was employed in place of styrene-dimethylaminoethyl methacrylate copolymer.

The toner obtained had a number average size of 9.2 μm, a number distribution in which particles of 6.35 μm or less comprised 22% and a volume distribution in which particles of 20.2 μm or more comprised 4%. By use of this toner, development and image formation were effected in the same manner as in Example 4A. As the result, although images were good at the beginning, in successive image formation, some fog began to appear from the 5000th sheet and the quality of images began to be lowered, that is, reproducibility of thin lines began to be deteriorated. Further, in the blocking test at 50° C. for this toner, blocking occurred in one night. The toner could be fixed by a fixing device applied with an oil at 160° C., but with accompaniment of the problem of off-setting.

EXAMPLE 1B

| | |
|---|---|
| Styrene monomer | 200 g |
| Styrene-dimethylaminoethyl methacrylate copolymer | 10 g |
| (monomer ratio 8:2, $\overline{Mw} = 50,000$) | |
| Paraffin wax 130° F. (product of Nihon Seiro K.K.) | 8 g |
| Azobisisobutyronitrile | 10 g |
| Phthalocyanine blue | 10 g |

The copolymer, paraffin wax, initiator, etc. were dissolved in the styrene monomer by warming all the ingredients mentioned above to 70° C. The mixture was mixed in a vessel equipped with a high shearing force mixer (TK-homomixer produced by Tokushukika Kogyo K.K.) for about 5 minutes, under heating at about 60° C. The monomer system thus obtained was subjected to suspension polymerization in the same manner as in Example 1A to produce a toner.

The toner obtained had a number average size of 9.1 μm, a number distribution in which particles of 6.35 μm or less comprised 18% and a volume distribution in which particles of 20.2 μm or more comprised 1% (Coulter counter, aperture 100 μm).

This toner was compared with the toners of Comparative Examples 1 to 3 described below which were prepared by the same process described above but had compositions different from that of Example 1B. The ingredients other than those given in the table below were the same as those employed in Example 1B.

| | Composition | | Distribution of particle size | | |
|---|---|---|---|---|---|
| | | | Number average size | Number distribution 6.35 μm or less | Volume distribution 20.2 μm or more |
| Example 1B | Cationic copolymer 10 g | Paraffin wax 130° F. | 9.1 μm | 18% | 1% |
| Comparative Example 1B | Cationic monomer (dimethylaminoethyl methacrylate) 2 g | None | 9.3 μm | 23% | 5% |
| Comparative Example 2B | Cationic monomer (dimethylaminoethyl methacrylate) 2 g | Present | 9.4 μm | 24% | 7% |

| | Quality of images | | Blocking at 50° C., three days | Fixing characteristics | | Free flowing property of toner |
|---|---|---|---|---|---|---|
| Sample | Initial stage | Successive 10000 sheets | | Fixing temperature | Off-set at fixing temperature | |
| Example 1B | 1 | 1 | 1 | 150° C. | 1 | 1 |
| Comparative Example 1B | 3 | 4 | 3 | 160° C. | 5 | 3 |
| Comparative Example 1B | 4 | 5 | 5 | 150° C. | 4 | 5 |

For evaluation, the results were classified into five ranks: 1, 2, 3, 4 and 5. Rank 2 indicate a practically satisfactory level and rank 1 better. This evaluation standard is also used in the tables appearing hereinafter.

A developing agent was prepared by mixing the toner with an iron powder carrier (EFV 250/400 produced by Nihon Teppun K.K.) at a level of the toner content of 10 wt.%. By use of this developing agent, image formation was effected by reversal development using a copying machine NP-5500. The fixing characteristic was tested by means of the fixing device applied with no releasing agent such as silicone oil of the copying machine PC-10. Free flowing property was estimated by visually observing the actual flowing condition in the developing device.

EXAMPLE 2B

| | |
|---|---|
| Styrene monomer | 180 g |
| Butyl acrylate monomer | 20 g |
| Styrene-diethylaminoethyl methacrylate copolymer | 10 g |
| (monomer ratio 9:1, $\overline{Mw}$ = 100,000) | |
| Paraffin wax 150° F. (produce of Nihon Seiro K.K.) | 8 g |
| Azobisisobutyronitrile | 10 g |
| Magnetite (BL-250 product of Titan Kogyo K.K.) | 120 g |
| Oxidized wax (ASA-30 product of Mitsubishi Kasei K.K.) | 1 g |

A toner was prepared by treating the monomer system consisting of the above ingredients in the same manner as in Example 1B.

The toner obtained has a number average size of 8.7 μm, a number distribution in which particles of 6.35 μm or less comprised 20% and a volume distribution in which particles of 20.2 μm or more comprised 0% (Coulter counter, aperture 100μ).

The following toners of comparative examples were prepared and compared with the toner of Example 2B in the same manner as in Example 1B.

EXAMPLE 3B

| | |
|---|---|
| Styrene monomer | 200 g |
| Copolymer of styrene and dimethyl-aminoethyl methacrylate quaternized by 5% with benzyl chloride | 10 g |
| (monomer ratio 9:1, $\overline{Mw}$ = 150,000) | |
| Azobisisobutyronitrile | 10 g |
| Paraffin wax 155° F. (product of Nihon Seiro K.K.) | 10 g |
| Divinylbenzene | 1 g |
| Phthalocyanine blue | 10 g |

The monomer system consisting of the above ingredients was treated in the same manner as in Example 1B to produce a toner. The toners of comparative examples were prepared in the same manner as that explained with reference to Examples 1 and 2.

| | | | Particle size distribution | | | Quality of images | | | Fixing characteristics | | |
|---|---|---|---|---|---|---|---|---|---|---|---|
| Sample | Composition | | Number average size | Number distribution 6.35 μm or less | Volume distribution 20.2 μm or more | Initial stage | Successive 10,000 sheets | Blocking at 50° C., three days | Fixing temp. | Off-set at fixing temperature | Off-set at 200° C. |
| Example 3B | Cationic polymer 10 g | Paraffin wax 155° F. | 8.4 μm | 17% | 0% | 1 | 1 | 1 | 150° C. | 1 | 1 |
| Comparative Example 7B | Cationic monomer (DMAEM) 1 g | None | 9.0 μm | 21% | 5% | 2 | 3 | 2 | 160° C. | 4 | 4 |
| Comparative Example 8B | Cationic monomer (DMAEM) 1 g | Present | 9.1 μm | 22% | 7% | 2 | 4 | 4 | 150° C. | 3 | 3 |

Image formation was effected according to the method in which development was carried out with a toner containing no magnetic material without mixing with carrier particles by conveying the toner to a developing section where it was to be held on the toner bearing member by electrostatic force.

Fixing characteristic was tested by use of the heat roller fixing device of the copying machine PC-10.

| | | | Particle size distribution | | | Quality of images | | | Fixing characteristics | | |
|---|---|---|---|---|---|---|---|---|---|---|---|
| Sample | Composition | | Number average size | Number distribution 6.35 μm or less | Volume distribution 20.2 μm or more | Initial stage | Successive 2000 sheets | Blocking at 50° C., three days | Fixing temp. | Off-set at fixing temperature | Free flowing property |
| Example 2B | Cationic polymer 10 g | Paraffin wax 155° F. | 8.7 μm | 20% | 0% | 1 | 1 | 1 | 155° C. | 1 | 1 |
| Comparative Example 4B | Cationic monomer (DMAEM*) 1 g | None | 9.1 μm | 25% | 5% | 1 | 2 | 3 | 165° C. | 5 | 3 |
| Comparative Example 5B | Cationic monomer (DMAEM*) 1 g | Present | 9.2 μm | 25% | 8% | 3 | 4 | 5 | 160° C. | 3 | 4 |

*DMAEM: Dimethylaminoethyl methacrylate

Image formation was effected by means of the copying machine PC-10, and fixing characteristic was also tested by the fixing device of the same machine.

EXAMPLE 4B

| | |
|---|---|
| Styrene monomer | 100 g |

-continued

| | |
|---|---|
| Styrene-dimethylaminoethyl methacrylate copolymer | 10 g |
| (monomer ratio 9:1, $\overline{Mw}$ = 150,000) | |
| Paraffin wax 155° F. (product of Nihon Seiro K.K.) | 100 g |
| 2,2'-Azobis-(2,4-dimethylvaleronitrile (V-65 product of Wako-junyaku Kogyo K.K.) | 10 g |
| Phthalocyanine blue | 10 g |
| Divinylbenzene | 1 g |

The monomer system consisting of the above ingredients was treated in the same manner as in Example 1B to produce a toner. The toners of comparative examples were prepared in the same manner as that explained with reference to Examples 1B to 3B for comparison with that of Example 4B.

| | | | Particle size distribution | | | Quality of images | | Blocking at 50° C., three days | Fixing characteristics | | |
|---|---|---|---|---|---|---|---|---|---|---|---|
| | | | | Number distribution 6.35 μm or less | Volume distribution 20.2 μm or more | | | | | Off-set at fixing temperature | Free flowing property |
| Sample | Composition | | Number average size | | | Initial stage | Successive 10,000 sheets | | Linear pressure 15 kg | | |
| Example 4B | Cationic polymer 10 g | Paraffin wax 155° F. | 8.5 μm | 17% | 0% | 1 | 1 | 2 | 1 | 2 | 1 |
| Comparative Example 10B | Cationic monomer (DMAEM) 1 g | Paraffin wax 155° F. | 8.8 μm | 21% | 4% | 3 | 5 | 5 | 1 | 2 | 3 |

The method used is the same as in Example 3B. Fixing characteristic was tested by use of a pressure fixing device equipped with a rigid roller.

EXAMPLE 1C

The procedure up to suspension polymerization and filteration was repeated in completely the same manner as in Example 1A. To the polymer obtained was added 40 g of a 1% aqueous solution of N-β-(N-vinylbenzylaminoethyl)-γ-aminopropyl trimethoxysilane hydrochloride (SZ6032 produced by Toray Silicone K.K.) and the mixture was stirred at room temperature for one hour, whereby the dispersant on the surface of the polymer was coupled with the silane coupling agent. Thereafter, the polymer was filtered, washed with water and dried to obtain a toner. The toner obtained had a number average size of 9.05 μm, a number distribution in which particles of 6.35 μm or less comprised 17% and a volume distribution in which particles of 20.2 μm or more comprised 1% (Coulter counter, aperture 100 μm).

The toner was also mixed with iron powder carrier EFV 150/400 at a level of the toner content of 10 wt.%. The triboelectric charge of the mixture was measured to be +16.7 μC/g. By use of this developing agent, reversal development was conducted by means of a copying machine (NP-5500 produced by Canon K.K.). As the result, good images were obtained. Moreover, when this toner was subjected to the blocking test at 50° C., no blocking occurred at all after one week or longer. The quality of the images obtained under high humidity was equal to that of the images obtained under normal humidity.

For comparison, a toner was prepared by repeating the same procedure in the above example except that treatment with silane coupling agent (SZ6032) was omitted. The quality of images formed under high temperature and high humidity was somewhat bad.

EXAMPLE 2C

| | |
|---|---|
| Styrene monomer | 180 g |
| Butyl acrylate monomer | 20 g |
| Styrene-diethylaminoethyl methacrylate copolymer | 10 g |
| (monomer ratio 9:1, $\overline{Mw}$ = 100,000) | |
| Azobisisobutyronitrile | 10 g |
| Magnetite (BL-250 produced by Titan Kogyo K.K.) | 120 g |
| Oxidized wax (ASA-30 produced by Mitsubishi Kasei K.K.) | 1 g |

Suspension polymerization and filtration were carried out in the same manner as in Example 1C except that the monomer system with the composition described above was used. To the polymer was added 16 g of a 5% aqueous solution of N-β(aminoethyl)-γ-aminopropyl trimethoxy silane (SH 6020, produced by Toray Silicone K.K.) and then the mixture was stirred at room temperature for three hours. After filtration, the polymer was washed with water and dried to obtain a toner. The toner obtained had a number average size of 8.5 μm, a number distribution in which particles of 6.35 μm or less comprised 20% and a volume distribution in which particles of 20.2 μm or more comprised 0% (Coulter counter, aperture 100 μm). This toner was charged in a copying machine (PC-10 produced by Canon K.K.), and image formation was effected. As the result, good images were obtained. Further, in successive image formation for 2000 sheets, images were also good. In the blocking test, no blocking occurred for one week or longer. Under high temperature and high humidity, good images were also formed.

The toner which was not treated with the coupling agent SH 6020 after polymerization had a somewhat bad image quality.

EXAMPLE 3C

| | |
|---|---|
| Styrene monomer | 200 g |
| Styrene dimethylaminoethyl methacrylate copolymer | 10 g |
| (monomer ratio 8.5:1.5, $\overline{Mw}$ = 150,000) | |
| 2,2'-azobis-(2,4-dimethylvarenonitrile) (V-65, product of Wako-junyaku Kogyo K.K.) | 10 g |
| Phthalocyanine blue | 10 g |
| Divinylbenzene | 1.0 g |

A toner was prepared from the above monomer system in the same manner as in Example 1C except that the monomer system with the above composition was used. The toner obtained had a number average size of 8.7 μm, a number distribution in which particles of 6.35 μm or less comprised 17% and a volume distribution in which particles of 20.2 μm or more comprised 1% (Coulter counter, aperture 100μ).

Image formation was carried out by the method of conveying the toner to a developing section where it is to be held on the toner bearing member by electrostatic force for development. As the result, good images were obtained. In successive image formation, images were formed stably for 20,000 sheets. Moreover this toner had no problem of blocking at 50° C., and it showed good fixing property in the system applied with silicone oil of a fixing device at 160° C. without the problem of off-set.

EXAMPLE 4C

| | |
|---|---|
| Styrene monomer | 200 g |
| Styrene-dimethylaminoethyl methacrylate copolymer | 10 g |
| (monomer ratio :2, $\overline{Mw}$ = 50,000) | |
| Azobisisobutyronitrile | 10 g |
| Phthalocyanine blue | 10 g |

The procedure up to suspension polymerization was repeated in the same manner as in Example 1A except that the monomer system with the above composition was used. Subsequently, to the polymer system was added 2 g of NaOH, and the polymer system was stirred at room temperature for six hours, filtered and washed with water to remove the Aerosil. Thereafter, to the polymer system was added 20 g of a 20% aqueous solution of SZ-6032 (product of Toray Silicone K.K.), and the polymer system was stirred at room temperature for an hour, washed with water and dried to obtain a toner. The toner obtained had a number average size of 9.05 μm, a number distribution in which particles of 6.35 μm or less comprised 17% and a volume distribution in which particles of 20.2 μm or more comprised 1% (Coulter counter, aperture 100μ).

The toner was also mixed with iron powder carrier EFV 250/400 at a level of the toner content of 10 wt.%. The triboelectric charge of the mixture was measured to be +10.4 μC/g. By use of this developing agent, reversal development was conducted by means of a copying machine (NP-5500 produced by Canon K.K.). As the result, good images were obtained. In successive image formation for 50,000 sheets, good images were also obtained stably. Moreover, when this toner was subjected to the blocking test at 50%, no blocking occurred at all after one week or longer. Good quality was also obtained under high temperature and high humidity.

EXAMPLE 5C

| | |
|---|---|
| Styrene monomer | 200 g |
| Styrene-dimethylaminoethyl methacrylate copolymer | 10 g |
| (monomer ratio 8:2, $\overline{Mw}$ = 50,000) | |
| Azobisisobutyronitrile | 10 g |
| Phthalocyanine blue | 10 g |

The procedure was repeated up to polymerization in the same manner as in Example 1A except that the monomer system with the composition described above was used. To the polymer particles obtained was added 2 g of isopropyl triisostearoyl titanate (TTS 2-3099, produced by Ajinomoto K.K.), and the polymer system was stirred at room temperature for three hours, filtered, washed with water and dried to obtain a toner. The toner obtained had a number average size of 9.05 μm, a number distribution in which particles of 6.35 μm or less comprised 17% and a volume distribution in which particles of 20.2 μm or more comprised 1% (Coulter counter, aperture 100μ).

The toner was also mixed with iron powder carrier EFV 250/400 at a level of the toner content of 10 wt.%. The triboelectric charge of the mixture was measured to be −14.7 μC/g. By use of this developing agent, reversal development was conducted by means of a copying machine (NP-5500, produced by Canon K.K.). As the result, good images were obtained. In successive image formation for 50,000 sheets, good images were also obtained stably. Moreover, when this toner was subjected to the blocking test at 50° C., no blocking occurred at all after one week or longer. Good image quality was also obtained under high temperature and high humidity.

EXAMPLE 1D

The procedure up to polymerization and filtration was repeated in the same manner as in Example 1B. Subsequently, to the polymer system was added 3 g of isopropyl triisostearoyl titanate (TTS 2-3099, produced by Ajinomoto K.K.), and the polymer system was stirred at room temperature to carry out the reaction. After the dispersant was treated with the coupling agent, the polymer system was washed with water, filtered and dried to obtain a toner.

The toner obtained had a number average size of 9.1 μm, a number distribution in which particles of 6.35 μm or less comprised 18% and a volume distribution in which particles of 20.2 μm or more comprised 1% (Coulter counter, aperture 100μ).

The properties of this toner are given in the following table.

| Quality of images | | Blocking | Fixing properties | | |
|---|---|---|---|---|---|
| Initial stage | Successive 10,000 sheets | at 50° C. Three days | Fixing temp. | Off-set at fixing temp. | Free flowing property of the toner |
| 1 | 1 | 1 | 150° C. | 1 | 1 |

A developing agent was prepared by mixing the toner with an iron powder carrier (EFV 150/400 produced by Nihon Teppun K.K.) at a level of the toner content of 10 wt.%. By use of this developing agent, image formation was effected by reversal development using a copying machine NP-5500. The fixing characteristic was tested by means of the fixing device applied with no releasing agent such as silicone oil of the copying machine PC-10. Free flowing property was evaluated by visually observing the actual flowing condition in the developing device.

The toner which was not treated with the titanate coupling agent had a somewhat bad image quality under high temperature and high humidity.

EXAMPLE 2D

| | |
|---|---|
| Styrene monomer | 180 g |
| Butyl acrylate monomer | 20 g |
| Styrene-diethylaminoethyl methacrylate copolymer | 10 g 10 g |
| (monomer ratio 9:1, $\overline{Mw}$ = 100,000) | |
| Paraffin wax 150° F. (product of Nihon Seiro K.K.) | 8 g |
| Azobisisobutyronitrile | 10 g |
| BL-250 (product of Titan Kogyo K.K.) | 60 g |
| ASA-30 (product of Mitsubishi Kasei K.K.) | 1 g |

A polymer was prepared in the same manner as in Example 1D except that the monomer system with the composition described above was used. The polymer was treated with 5 g of (coupling agent, N-β-(B-vinyl benzylaminoethyl)-γ-aminopropyl trimethoxysilane salt (SZ-6032, produced by Toray Silicone K.K.), to produce a toner.

The toner obtained had a number average size of 8.7 μm, a number distribution in which particles of 6.35 μm or less comprised 20% and a volume distribution in which particles of 20.2 μm or more comprised 0% (Coulter counter, aperture 100μ).

The properties of this toner are given in the following table.

| Quality of images | | Blocking | Fixing properties | | Free flowing |
|---|---|---|---|---|---|
| Initial stage | Successive 2,000 sheets | at 50° C. Three days | Fixing temp. | Off-set at fixing temp. | property of the toner |
| 1 | 1 | 1 | 155° C. | 1 | 1 |

Image formations were effected by use of the copying machine (PC-10), and fixing characteristics were tested using the fixing device of the same machine. By use of the toner which was not coupled with SZ-6032, formed images becomes somewhat thinner under high temperature and high humidity.

EXAMPLE 3D

| | |
|---|---|
| Styrene monomer | 200 g |
| Copolymer of styrene and dimethylaminoethyl methacrylate quaternized by 5% with benzyl chloride | 10 g |
| (monomer ratio 9:1, $\overline{Mw}$ = 50,000) | |
| Azobisisobutyronitrile | 10 g |
| Paraffin wax 155° F. (product of Nihon Seiro K.K.) | 10 g |
| Divinyl benzene | 1 g |
| Phthalocyanine green | 10 g |

A toner was prepared in the same manner as in Example 1D except that the monomer system with the composition described above. This toner had the following properties.

| | Distribution of particle size | |
|---|---|---|
| Number average size | Number distribution 6.35 μm or less | Volume distribution 20.2 μm or more |
| 8.4 μm | 17% | 0% |

| Quality of images | | Blocking at 50° C. |
|---|---|---|
| Initial stage | successive 10,000 sheets | Three days |
| 1 | 1 | 1 |

| | Fixing characteristic | |
|---|---|---|
| Fixing temperature | Off-set at fixing temp. | Off-set at 200° C. |
| 150° C. | 1 | 1 |

Image formation was effected according to the method in which development was carried out with a toner containing no magnetic material without mixing with carrier particles by conveying the toner to a developing section where it was to be held on the toner bearing member by electrostatic force.

Fixing characteristic was tested by use of the heat roller fixing device of the copying machine PC-10.

EXAMPLE 4D

| | |
|---|---|
| Styrene monomer | 100 g |
| Styrene-dimethylaminoethyl methacrylate copolymer | 10 g |
| (monomer ratio 9:1, $\overline{Mw}$ = 150,000) | |
| Paraffin wax 155° F. (product of Nihon Seiro K.K.) | 100 g |
| 2,2'-azobis-(2,4-dimethylvaleronitrile) (V-85 product of Wako-junyaku Kogyo K.K.) | 10 g |
| Phthalocyanine blue | 10 g |
| Divinylbenzene | 1 g |

A toner was prepared in the same way as in Example 1D except that the monomer system with the composition described above was employed.

| Distribution of a particle size | | | Quality of images | |
|---|---|---|---|---|
| Number average size | Number distribution 6.35 μm or less | Volume distribution 20.2 μm or more | Initial stage | Successive 5,000 sheets |
| 8.5 μm | 18% | 0% | 1 | 1 |

| | Fixing characteristic | | |
|---|---|---|---|
| Blocking at 50° C. Three days | Linear pressure 15 kg | Off-set | Free flowing property of toner |
| 2 | 1 | 2 | 1 |

The method of development used herein was the same as in Example 3D. Fixing characteristics were tested by use of a pressure fixing device equipped with a rigid roller.

When the toner the surface of which was not treated with the titanate coupling agent was used, the images formed were thin under high temperature and high humidity and the coating property of the toner on the sleeve of a developing device was also bad.

EXAMPLE 1E

The procedure upto polymerization was repeated in the same manner as in Example 1A. Thereafter, sodium hydroxide in an amount of 4% by weight of the polymer was thrown into the polymerizer, and while under heating at 40° C., the mixture was stirred for six hours at a rotation speed such that no sedimentation of particles may occur. Then, the mixture was filtered, washed sufficiently with water and dried to produce a toner. The toner obtained had a number average size of 9.05 μm, a number distribution in which particles of 6.35 μm or less comprised 17% and a volume distribution in which particles of 20.2 μm or more comprised 1% (Coulter counter, aperture 100μ).

The toner was also mixed with iron powder carrier EFV 250/400 at a level of the toner content of 10 wt.%. The triboelectric charge of the mixture was determined to be +20.3 μC/g. By use of this developing agent, reversal development was conducted by means of a copying machine (NP-5500). As the result, good images were obtained. In the successive image formation for 50,000 sheets, good images were also obtained stably. Moreover, when this toner was subjected to the blocking test at 50° C., no blocking occurred at all after one week or longer.

In the above procedure, when no treatment with sodium hydroxide was applied to the suspended polymer, and image formation was effected under high humidity of 90% RH at 32° C., the images formed with the toner obtained without NaOH treatment example were somewhat bad in quality, with increase of fog, while the toner obtained through the NaOH treatment bad no problem.

EXAMPLE 2E

| | |
|---|---|
| Styrene monomer | 180 g |
| Butyl acrylate monomer | 20 g |
| Styrene-diethylaminoethyl methacrylate copolymer | 10 g |
| (monomer ratio 9:1, $\overline{Mw}$ = 100,000) | |
| Azobisisobutyronitrile | 10 g |
| Megnetite (BL-250 produced by Titan Kogyo K.K.) | 120 g |
| Oxidized wax (ASA-30 produced by Mitsubishi Kasei K.K.) | 1 g |

A polymer was prepared by suspension polymerization in the same way as in Example 1E except that the monomer system with the composition described above was employed. The polymer obtained was stirred for three hours in an aqueous solution containing potassium carbonate in an amount of 6% by weight of the polymer. Then the polymer was filtered, washed with water and dried to obtain a toner.

The toner obtained had a number average size of 8.5 μm, a number distribution in which particles of 6.35 μm or less comprised 20% and a volume distribution in which particles of 20.2 μm or more comprised 0% (Coulter counter, aperture 100μ). This toner was charged in a copying machine (PC-10), and image formation was effected. As the result, good images were obtained. Further, in successive image formation of 2,000 sheets, images were also good. In the blocking test at 50° C., no blocking occurred for one week or longer.

On the other hand, when a toner obtained without treatment with potassium carbonate was employed for copying by PC-10, the image quality was somewhat bad under high temperature and high humidity.

Evaluations under highly humid environment at 32° C., 90% are as shown below.

| | Images |
|---|---|
| Toner treated with potassium carbonate | 1 |
| Toner not treated with potassium carbonate | 2 |

EXAMPLE 3E

| | |
|---|---|
| Styrene monomer | 200 g |
| Copolymer of styrene and dimethyl-aminoethyl methacrylate quaternized by 5% with benzyl chloride | 10 g |
| (monomer ratio 9:1, $\overline{Mw}$ = 150,000) | |
| Azobisisobutyronitrile | 10 g |
| Phthalocyanine green | 10 g |

The monomer system with the composition described above was subjected to polymerization in the same way as in Example 1E to produce a toner. The toner obtained had a number average size of 8.3 μm, a number distribution in which particles of 6.35 μm or less comprised 18% and a volume distribution in which particles of 20.2 μm or more comprised 0% (Coulter counter, aperture 100μ). By use of this toner, image formation was effected in the same manner as in Example 1E. The triboelectric charge of the toner was +12.1 μC/g, and the images were good. In successive image formation, images without fog were formed stably for 50,000 sheets. Also, there was no problem in the blocking test at 50° C.

On the other hand, the toner not subjected to treatment with sodium hydroxide gave somewhat bad image quality under high temperature and high humidity. The following is the results of evaluation of images formed under high humidity of 80% at 35%.

| | Images |
|---|---|
| Toner treated with sodium hydroxide | 1 |
| Toner not treated with sodium hydroxide | 2 |

EXAMPLE 4E

| | |
|---|---|
| Styrene monomer | 200 g |
| Styrene-dimethylaminoethyl methacrylate copolymer | 10 g |
| (monomer ratio 8.5:1.5, $\overline{Mw}$ = 150,000) | |
| 2,2'-azobis-(2,4-dimethylvaleronitrile) (V-65, product of Wako-junyaku Kogyo K.K.) | 10 g |
| Azobisisobutyronitrile | 10 g |
| Phthalocyanine blue | 10 g |
| Divinylbenzene | 10 g |

A toner was prepared in the same manner as in Example 1E except that the monomer system with the above composition was used. The toner obtained had a number average size of 8.7 μm, a number distribution in which particles of 6.35 μm or less comprised 17% and a volume distribution in which particles of 20.2 μm or more comprised 1% (Coulter counter, aperture 100μ).

Image formation was effected according to the method in which development was carried out with a toner containing no magnetic material without mixing with carrier particles by conveying the toner to a developing section where it was to be held on the toner bearing member by electrostatic force.

As the result, good images were obtained. In successive image formation, images were formed stably for 20,000 sheets. This toner had no problem in the blocking test at 50° C. and gave good results in the test of fixing characteristic without any problem of off-set in the system applied with silicone oil at 160° C. of a fixing device.

The toner prepared by filtration and drying without treatment with sodium hydroxide gave somewhat bad image quality under high temperature and high humidity.

The toners were evaluated under high humidity of 80% at 35° C. The results were as follows.

|  | Images |
|---|---|
| Example | 1 |
| Comparative Example | 2 |

EXAMPLE 1F

The procedure of Example 1B upto polymerization was repeated. To the resultant suspension was added 15 g of sodium hydroxide, and the suspension was stirred at room temperature for ten hours, filtered, washed with water and dried to obtain a toner.

The toner obtained had a number average size of 9.1 $\mu$m, a number distribution in which particles of 6.35 $\mu$m or less comprised 18% and a volume distribution in which particles of 20.2 $\mu$m or more comprised 1% (Coulter counter, aperture 100$\mu$).

The properties of this toner were as follows.

| Quality of images | | Blocking at 50° C. |
|---|---|---|
| Initial stage | successive 10,000 sheets | Three days |
| 1 | 1 | 1 |

| Fixing characteristic | | | |
|---|---|---|---|
| Fixing temp. | Off-set at fixing temp. | Off-set at 200° C. | Free flowing of toner |
| 150° C. | 1 | 1 | 1 |

A developing agent was prepared by mixing the toner with an iron powder carrier (EFC 250/400 produced by Nihon Teppun K.K.) at a level of the toner content of 10 wt.%. By use of this developing agent, image formation was effected by reversal development using a copying machine NP-5500. The fixing characteristic was tested by means of the fixing device applied with no releasing agent such as silicone oil of the copying machine PC-10. Free flowing property was evaluated by visually observing the actual flowing condition in the developing device.

The toner obtained without the sodium hydroxide treatment gave somewhat bad image quality under high temperature and high humidity.

EXAMPLE 2F

| Styrene monomer | 180 g |
|---|---|
| Butyl acrylate monomer | 20 g |
| Styrene-diethylaminoethyl methacrylate copolymer | 10 g |
| (monomer ratio 9:1, $\overline{Mw}$ = 100,000) | |
| Paraffin wax 150° F. (Nihon Seiro) | 8 g |
| Azobisisobutyronitrile | 10 g |
| BL-250 (produced by Titan Kogyo K.K.) | 80 g |
| ASA-30 (produced by Mitsubishi Kasei K.K.) | 1 g |

A toner was prepared in the same manner as in Example 1F except that the monomer system with the above composition was used. The toner obtained had a number average size of 8.5 $\mu$m, a number distribution in which particles of 6.35 $\mu$m or less comprised 20% and a volume distribution in which particles of 20.2 $\mu$m or more comprised 0% (Coulter counter, aperture 100$\mu$). The properties of this toner was as given in the following table.

| Quality of images | | Blocking at 50° C. | Fixing Characteristic | | Free flowing property of toner |
|---|---|---|---|---|---|
| Initial stage | Successive 2,000 sheets | Three days | Fixing temp. | Off-set at fixing temp. | |
| 1 | 1 | 1 | 155 C. | 1 | 1 |

Image formation was effected by use of the copying machine (PC-10), and the fixing device of the machine was also used. If the toner untreated with alkali provided was used, the density of the images formed was low initially and became lower as successive copying was conducted.

EXAMPLE 3F

| Styrene monomer | 200 g |
|---|---|
| Copolymer of styrene and dimethyl-aminoethyl methacrylate quaternized by 5% with benzyl chloride | 10 g |
| (monomer ratio 9:1, $\overline{Mw}$ = 80,000) | |
| Azobisisobutylonitrile | 10 g |
| Paraffin was 155° F. (Nihon Seiro K.K.) | 10 g |
| Divinylbenzene | 1 g |
| Phthalocyanine blue | 10 g |

A toner was prepared in the same manner as in Example 1F except that the monomer system with the above composition was used. The distribution of particle sizes and properties of this toner were as follows.

| Distribution of particle size | | |
|---|---|---|
| Number average size | Number distribution 6.35 $\mu$m or less | Volume distribution 20.2 $\mu$m or more |
| 8.4 $\mu$m | 17% | 0% |

| Quality of images | | Blocking at 50° C. | Fixing Characteristic | | |
|---|---|---|---|---|---|
| stage | Successive 10,000 sheets | Three days | Fixing temp. | Off-set at fixing temp. | Off-set at 200° C. |
| 1 | 1 | 1 | 150° C. | 1 | 1 |

Image formation was effected according to the method in which development was carried out with a toner containing no magnetic material without mixing with carrier particles by conveying the toner to a developing section where it was to be held on the toner bearing member by electrostatic force.

Fixing characteristic was tested by use of the heat roller fixing device of the copying machine PC-10.

EXAMPLE 4F

| | |
|---|---|
| Styrene monomer | 200 g |
| Styrene-dimethylaminoethyl methacrylate copolymer | 10 g |
| (monomer ratio 9:1, $\overline{Mw}$ = 150,000) | |
| Paraffin wax 155° F. (Nihon Seiro K.K.) | 100 g |
| V-65 (product of Wako-junyaku Kogyo K.K.) | 10 g |
| Phthalocyanine blue | 10 g |
| Divinylbenzene | 1 g |

A toner was prepared in the same manner as in Example 1F except that the monomer system with the above composition was used.

| Distribution of particle size | | |
|---|---|---|
| Number average size | Number distribution 6.35 μm or less | Volume distribution 20.2 μm or more |
| 8.5 μm | 18% | 0% |

| Quality of images | | Blocking at 50° C. Three days | Fixing Characteristics | | Free flowing property of toner |
|---|---|---|---|---|---|
| Initial stage | Successive 5,000 sheets | | Linear pressure 15 kg | Off-set | |
| 1 | 1 | 2 | 1 | 2 | 1 |

The developing method used was the same as in Example 3F. Fixing characteristic was tested by use of the heat roller fixing device of the copying machine PC-10. A toner obtained without removing the dispersant on the surface thereof by alkali treatment, gave undesirably insufficient image density under high temperature and high humidity.

EXAMPLE 1G

| | |
|---|---|
| Styrene monomer | 200 g |
| Styrene-maleic anhydride copolymer | 10 g |
| (monomer ratio 8:2, $\overline{Mw}$ = 30,000) | |

After the above copolymer was dissolved in styrene monomer under warming at 60° C., 10 g of phthalocyanine blue was thrown into the solution. The solution was mixed in a vessel equipped with a high shearing force mixer (TK-homomixer produced by Tokushukika Kogyo K.K.) for about 5 minutes. Then 10 g of azobisisobutyronitrile was thrown into the solution to obtain a monomer system. Separately, 4 g of hydrophilic positively chargeable silica treated with $H_2N-CONH-CH_2CH_2CH_2-Si-(OC_2H_5)_3$ was dispersed in 1000 cc of water and the dispersion was warmed at 60° C. The monomer system described above was thrown into the dispersion under stirring by means of TK-homomixer, followed by stirring at 4000 rpm for about one hour. Thereafter, this mixture system was stirred by means of a paddle stirring blade to complete polymerization. Then, after removal of the dispersant, the resultant polymer was washed with water, filtered and dried to obtain a toner. The toner obtained had a number average size of 8.95 μm, a number distribution in which particles of 6.35 μm or less comprised 18% and a volume distribution in which particles of 20.2 μm or more comprised 1% (Coulter counter, aperture 100μ).

The toner was mixed with iron powder carrier EFV 250/400 at a level of the toner content of 10 wt.%. The triboelectric charge of the mixture was measured to be $-12.4$ μC/g. By use of this developing agent, development was conducted by means of a copying machine (NP-5500 produced by Canon K.K.) As the result, good images were obtained. In successive image formation for 50,000 sheets, good images were stably formed. Moreover, when this toner was subjected to the blocking test at 50° C., no blocking occurred at all after one week or longer.

COMPARATIVE EXAMPLE 1G

| | |
|---|---|
| Monomer system | |
| Styrene monomer | 208 g |
| Maleic anhydride | 2 g |
| Azobisisobutyronitrile | 10 g |
| Phthalocyanine blue | 10 g |
| Suspension medium | |
| Water | 1000 cc |
| Colloidal silica treated by 10% with $H_2N-CONH-CH_2CH_2CH_2-Si(OC_2H_5)_3$ | 4 g |

The monomer system with the above composition and the above suspension medium are prepared, mixed and subjected to suspension polymerization in the same manner as in Example 1G to obtain a toner.

The toner obtained had a number average size of 9.2 μm, a number distribution in which particles of 6.35 μm or less comprised 30% and a volume distribution in which particles of 20.2 μm or more comprised 6%. The triboelectric charge determined in the same manner as in Example 1G was substantially the same as in Example 1G, i.e., $-11.3$ μC/g. However, in successive image formation, images became bad with formation of fog after about 5000 of copying.

EXAMPLE 2G

| | |
|---|---|
| Monomer system | |
| Styrene monomer | 180 g |
| Butyl acrylate monomer | 20 g |
| Styrene-diethylaminoethyl methacrylic acid copolymer | 10 g |
| (monomer ratio 9:1, $\overline{Mw}$ = 100,000) | |
| Azobisisobutyronitrile | 10 g |
| BL-250 (produced by Titan Kogyo K.K.) | 120 g |
| ASA-30 (produced by Mistubishi Kasei K.K.) | 1 g |
| Suspension medium | |
| Water | 1000 cc |
| Colloidal silica treated by 10% with $H_2N-CONH-CH_2CH_2CH_2-Si(OC_2H_5)_3$ | 4 g |

The monomer system with the above composition and the above suspension medium were prepared, mixed and subjected to suspension polymerization in the same manner as in Example 1G to obtain a toner.

The toner obtained had a number average size of 8.8 μm, a number distribution in which particles of 6.35 μm or less comprised 20% and a volume distribution in which particles of 20.2 μm or more comprised 0% (Coulter counter, aperture 100μ). The triboelectric charge was $-11.0$ μC/g. This toner was charged in a copying machine (NP-400RE), and image formation was effected. As the result, good images were obtained. Further, in successive image formation for 2000 sheets, images were also good. In the blocking test 50° C. for this toner, no blocking occurred for one week or longer.

COMPARATIVE EXAMPLE 2G

A toner was obtained in the same way as in Example 2G except that 1 g of methacrylic acid monomer was employed in place of styrene-methacrylic acid copolymer. The toner obtained had a number average size of 9.2 μm, a number distribution in which particles of 6.3 μm or less comprised 28% and a volume distribution in which particles of 20.2 μm or more comprised 6%. This toner was charged in a copying machine (NP-400), and image formation was effected. As the result, images with fog were obtained. In successive image formation, fog on the sheets became increased after about 1000 sheets of copying to worsen images. In the blocking test at 50° C. for this toner, blocking occurred in two days.

EXAMPLE 3G

| | |
|---|---|
| Styrene monomer | 200 g |
| Copolymer of styrene and 2-hydroxy-ethyl methacrylate | 10 g |
| (monomer ratio 9:1, $\overline{Mw}$ = 50,000) | |
| Azobisisobutyronitrile | 10 g |
| Phthalocyanine blue | 10 g |

The above monomer system was subjected to polymerization in the same way as in Example 1G to produce a toner. The toner obtained had a number average size of 8.2 μm, a number distribution in which particles of 6.35 μm or less comprised 19% and a volume distribution in which particles of 20.2 μm or more comprised 0.5% (Coulter counter, aperture 100μ). By use of this toner, image formation was effected in the same manner as in Example 1A.

The triboelectric charge of the toner was +12.1 μC/g, and the images were good. In successive image formation, images without fog were formed stably for 10,000 sheets. There was no problem in the blocking test at 50° C.

EXAMPLE 1H

| | |
|---|---|
| Styrene monomer | 200 g |
| Styrene-maleic acid anhydride copolymer | 10 g |
| (monomer ratio 9:1, $\overline{Mw}$ = 50,000) | |
| Paraffin wax 130° F. | 8 g |
| (product of Nihon Seiro K.K.) | |
| Azobisisobutyronitrile | 10 g |
| Phthalocyanine blue | 10 g |

The copolymer, paraffin wax, initiator, etc. were dissolved in the styrene monomer by warming all the ingredients mentioned above to 70° C. The mixture was mixed in a vessel equipped with a high shearing force mixer (TK-homomixer produced by Tokushukika Kogyo K.K.) for about 5 minutes, under heating at about 60° C.

Separately, 4 g of hydrophilic positively chargeable silica treated with 10% thereof of $H_2N—CONH—CH_2CH_2CH_2—Si(OC_2H_5)_3$ was dispersed in 1000 cc of water and the dispersion was warmed at 60° C. The monomer system described above was thrown into the dispersion under stirring by means of TK-homomixer, followed by stirring at 4000 rpm for about one hour. Thereafter, this mixture system was stirred by means of a paddle stirring blade to complete polymerization. Then, after removal of the dispersant, the resultant polymer was washed with water, filtered and dried to obtain a toner. The toner obtained had a number average size of 9.4 μm, a number distribution in which particles of 6.35 μm or less comprised 18% and a volume distribution in which particles of 20.2 μm or more comprised 1% (Coulter counter, aperture 100μ).

This toner was compared with the toners of Comparative Examples 1H to 3H described below which were prepared by the same process described above but had compositions different from that of Example 1H. The ingredients other than those given in the table below were the same as those employed in Example 1H.

| | | | Particle size distribution | | | Quality of image | | Blocking at 50° C. three days | Fixing characteristics | | | |
|---|---|---|---|---|---|---|---|---|---|---|---|---|
| Sample | Composition | | Number average size | Number distribution 6.35 μm or less | Volume distribution 20.2 μm or more | Initial stage | Successive 10,000 sheets | | Fixing temperature | Off-set at fixing temperature | Free flowing property of toner | Abrasion resistance |
| Example 1H | Anionic copolymer | Paraffin wax 130° F. | 9.4 μm | 18% | 1% | 1 | 1 | 1 | 150° C. | 1 | 1 | 1 |
| Comparative Example 1H | Anionic monomer (maleic anhydride 1 g) | None | 9.7 μm | 30% | 5% | 3 | 4 | 3 | 160° C. | 5 | 3 | 3 |
| Comparative Example 2H | Anionic monomer (maleic anhydride 1 g) | Present | 9.9 μm | 30% | 7% | 4 | 5 | 5 | 150° C. | 4 | 5 | 4 |

A developing agent was prepared by mixing the toner with an iron powder carrier (EFV 250/400 produced by Nihon Teppun K.K.) at a level of the toner content of 10 wt.%. By use of this developing agent, image formation was effected using a copying machine NP-5500. The fixing characteristic was tested by means of the fixing device applied with no releasing agent such as silicone oil of the copying machine PC-10. Free flowing property was evaluated by visually observing the actual flowing condition in the developing device.

Wear resistance of the toner was estimated by determining the amount of spent toner, that is, the toner adhering to the carrier separated from the toner after use of the developing agent for the successive image formations. The results were rated at five ranks from 1

(substantially no toner adhered to the carrier) to 5 (extremely much toner adhered to the carrier). The results obtained corresponded to quality of the images obtained in the successive image formation.

EXAMPLE 2H

| | |
|---|---|
| Styrene monomer | 180 g |
| Butyl acrylate monomer | 20 g |
| Styrene-methacrylic acid copolymer | 10 g |
| (monomer ratio 9:1, $\overline{Mw}$ = 100,000) | |
| Paraffin wax (produce by Nihon Seiro K.K.) | 10 g |
| Azobisisobutyronitrile | 10 g |
| BL-250 (product of Titan Kogyo K.K.) | 120 g |
| ASA-30 (produce of Mitsubishi Kasei K.K.) | 1 g |

A toner was prepared from the monomer system consisting of the above ingredients in the same manner as in Example 1H. The toner obtained had a number average size of 8.7 μm, a number distribution in which particles of 6.35 μm or less comprised 20% and a volume distribution in which particles of 20.2 μm or more comprised 0% (Coulter counter, aperture 100μ).

The following toners of comparative examples were prepared and compared with the toner of Example 1H in the same manner as in Example 1H.

Image formation was effected by means of the copying machine NP-400RE, and fixing characteristic was tested by the fixing device of the same machine.

Abrasion resistance of the toner was estimated by observing the degree of contamination on the sleeve after the toner thereon was removed and the surface thereof was wiped with MEK (methyl ethyl ketone). The results were rated at five ranks.

EXAMPLE 3H

| | |
|---|---|
| Styrene monomer | 200 g |
| Copolymer of styrene and 2-hydroxyethyl methacrylate | 10 g |
| (monomer ratio 9:1, $\overline{Mw}$ = 50,000) | |
| Azobisisobutyronitrile | 10 g |
| Paraffin wax 155° F. | 10 g |
| (product of Nihon Seiro K.K.) | |
| Divinylbenzene | 1 g |
| Phthalocyanine blue | 10 g |

A toner was prepared in the same manner as in Example 1H except that the monomer system with the above composition was used. The toners of comparative examples were prepared in the same manner as explained with reference to Examples 1H and 2H.

| Sample | Composition | | Particle size distribution | | | Quality of image | | Blocking at 50° C. three days | Fixing characteristics | | Free flowing property of toner | Abrasion resistance |
|---|---|---|---|---|---|---|---|---|---|---|---|---|
| | | | Number average size | Number distribution 6.35 μm or less | Volume distribution 20.2 μm or more | Initial stage | Successive 2,000 sheets | | Fixing temperature | Off-set at fixing temperature | | |
| Example 2H | Anionic copolymer | Paraffin wax 155° F. | 8.7 μm | 20% | 0% | 1 | 1 | 1 | 155° C. | 1 | 1 | 1 |
| Comparative Example 4H | Anionic monomer (methacrylic acid 1 g) | None | 9.0 μm | 30% | 5% | 1 | 2 | 3 | 165° C. | 5 | 3 | 3 |
| Comparative Example 5H | Anionic monomer (methacrylic acid 1 g) | Present | 9.1 μm | 30% | 8% | 3 | 4 | 5 | 160° C. | 3 | 4 | 4 |

| Sample | Composition | | Particle size distribution | | | Quality of image | | Blocking at 50° C. three days | Fixing characteristics | | Off-set 200° C. | Abrasion resistance |
|---|---|---|---|---|---|---|---|---|---|---|---|---|
| | | | Number average size | Number distribution 6.35 μm or less | Volume distribution 20.2 μm or more | Initial stage | Successive 10,000 sheets | | Fixing temperature | Off-set at fixing temperature | | |
| Example 3H | Anionic copolymer | Paraffin wax 155° F. | 8.4 μm | 17% | 0% | 1 | 1 | 1 | 150° C. | 1 | 1 | 1 |
| Comparative Example 7H | Anionic monomer (2-hydroxyethyl methacrylate 1 g) | None | 8.8 μm | 30% | 5% | 2 | 3 | 2 | 160° C. | 4 | 4 | 3 |
| Comparative Example 8H | Anionic monomer (2-hydroxyethyl methacrylate | Present | 9.1 μm | 30% | 7% | 2 | 4 | 4 | 150° C. | 3 | 3 | 5 |

|        |             | Particle size distribution | | | Quality of image | | Block-ing at 50° C. three days | Fixing characteristics | | | |
|--------|-------------|---|---|---|---|---|---|---|---|---|---|
| Sample | Composition | Number average size | Number distribution 6.35 μm or less | Volume distribution 20.2 μm or more | Initial stage | Successive 10,000 sheets | | Fixing temperature | Off-set at fixing temperature | Off-set 200° C. | Abrasion resistance |
|        | 1 g)        | | | | | | | | | | |

Image formation was effected according to the method in which development was carried out with a toner containing no magnetic material without mixing with carrier particle by conveying the toner to a developing section where it was to be held on the toner bearing member by electrostatic force.

Fixing characteristic was tested by use of the heat roller fixing device of the copying machine PC-10. Abrasion resistance was estimated in the same manner as in Example 2H.

EXAMPLE 4H

| | |
|---|---|
| Styrene monomer | 100 g |
| Styrene-maleic anhydride copolymer | 10 g |
| (monomer ratio 9:1, $\overline{Mw}$ = 150,000) | |
| Paraffin wax 155° F. | 100 g |
| (product of Nihon Seiro K.K.) | |
| V-65 (product of Wako-junyaku Kogyo K.K.) | 10 g |
| Phthalocyanine blue | 10 g |
| Divinylbenzene | 1 g |

A toner was prepared in the same manner as in Example 1H except that the monomer system consisting of the above ingredients was used. The toners of comparative examples were prepared in the same manner as in Examples 1H to 3H for comparison with that of Example 4H.

was filtered, washed with water and dried to obtain a toner. The toner obtained had a number average size of 8.95 μm, a number distribution in which particles of 6.35 μm or less comprised 18% and a volume distribution in which particles of 20.2 μm or more comprised 1% (Coulter counter, aperture 100μ).

The toner was also mixed with iron powder carrier EFV 250/400 at a level of the toner content of 10 wt.%. The triboelectric charge of the mixture was measured to be −14.0 μC/g. By use of this developing agent, development was conducted by means of a copying machine (NP-5500). As the result, good images were obtained. Moreover, when this toner was subjected to the blocking test at 50° C., no blocking occurred at all after one week or longer. Under high humidity of 80% at 32° C., there was observed no change in the images obtained with sufficient image density.

The toner obtained without coupling of the dispersant on the polymer surface with SH-6076 gave somewhat bad image quality under high temperature and high humidity.

EXAMPLE 2I

| | |
|---|---|
| Styrene monomer | 200 g |
| Styrene-2-hydroxyethyl methacrylate copolymer | 10 g |
| (monomer ratio 9:1, $\overline{Mw}$ = 50,000) | |

| | | Particle size distribution | | | Quality of image | | Block-ing at 50° C. three days | Fixing characteristics | | Free flowing property of toner | Abrasion resistance |
|---|---|---|---|---|---|---|---|---|---|---|---|
| Sample | Composition | Number average size | Number distribution 6.35 μm or less | Volume distribution 20.2 μm or more | Initial stage | Successive 5,000 sheets | | Linear pressure 15 kg | Off-set | | |
| Example 4H | Anionic copolymer 10 g | Paraffin wax 155° F. | 8.5 μm | 18% | 0% | 1 | 1 | 2 | 1 | 2 | 1 | 1 |
| Comparative Example 10H | Anionic monomer (maleic anhydride 1 g) | Paraffin wax 155° F. | 8.3 μm | 30% | 4% | 3 | 5 | 5 | 1 | 2 | 3 | 3 |

The developing method used was the same as in Example 3H. Fixing characteristic was tested by use of a pressure fixing device equipped with a rigid roller. Abrasion resistance was estimated in the same manner as in Example 3H.

EXAMPLE 1I

The procedure upto suspension polymerization was repeated in the same manner as in Example 1G. To the suspension obtained was added 40 g of an aqueous 10% solution of γ-chloropropyltrimethoxysilane (SH 6076, produced by Toray Silicone K.K.). The mixture was stirred at room temperature for one hour, whereby the dispersant on the surface of the polymer was coupled with the silane coupling agent. Thereafter, the polymer

| | |
|---|---|
| Azobisisobutyronitrile | 10 g |
| Phthalocyanine blue | 10 g |

The above monomer system was subjected to polymerization in the same way as in Example 1I. To the suspension obtained was added an aqueous solution containing isopropyl triisostearoyl titanate (KR-TTS, produced by Ajinomoto K.K.) in an amount of 1% by weight of the polymer and then the mixture was stirred at room temperature for two hours. After filteration, the polymer was washed with water and dried to obtain a toner. The toner obtained has a number average size of 8.2 μm, a number distribution in which particles of 6.35 μm or less comprised 19% and a volume distribution in which particles of 20.2 μm or more comprised 0.5% (Coulter counter, aperture 100μ). By use of this toner, image formation was effected in the same manner as in Example 1I. The triboelectric charge was measured to be −14.2 μC/g. In successive image formation, images without fog were stably formed for 10,000 sheets. This toner had no problem of blocking at 50° C. The images formed under high humidity of 80% RH at 32° C. were equivalent to those formed under normal conditions.

On the other hand, the toner untreated with the coupling agent KR-TTS after polymerization gave somewhat bad image quality under high temperature and high humidity.

EXAMPLE 3I

| Monomer system | |
| --- | --- |
| Styrene monomer | 180 g |
| Butyl acrylate monomer | 20 g |
| Styrene-methacrylic acid copolymer | 10 g |
| (monomer ratio 9:1, $\overline{Mw}$ = 100,000) | |
| Azobisisobutyronitrile | 10 g |
| BL-250 (produced by Titan Kogyo K.K.) | 120 g |
| ASA-30 (produced by Mitsubishi Kasei K.K.) | 1 g |
| Dispersion medium | |
| Water | 1000 cc |
| Colloidal silica treated by 10% with $H_2N—CONH—CH_2CH_2CH_2—Si(OC_2H_5)$ | 4 g |

The monomer system with the above composition and the suspension medium were prepared and subjected to polymerization in the same way as in Example 1I. To the suspension was added 2 g of vinyl tris(2-methoxyethoxy)silane (VTS-ME, produced by Chisso K.K.). The mixture obtained was stirred at room temperature for three hours, and then filtered, washed with water and dried to obtain a toner.

The toner obtained had a number average size of 8.8 μm, a number distribution in which particles of 6.35 μm or less comprised 20% and a volume distribution in which particles of 20.2 μm or more comprised 0% (Coulter counter, aperture 100μ). The triboelectric charge of the toner was −11.0 μC/g. This toner was charged in a copying machine (NP-400RE), and image formation was effected to produce good images. Further, in successive image formation for 2,000 sheets, images were also good. In the blocking test at 50° C., no blocking occurred for one week or longer.

Under high humidity of 80% RH at 32° C., the images obtained were equal to those obtained under normal conditions.

On the other hand, the toner untreated with VTS-ME gave somewhat inferior image quality under high temperature and high humidity.

EXAMPLE 4I

| Styrene monomer | 200 g |
| --- | --- |
| Styrene maleic acid anhydride copolymer | 10 g |
| (monomer ratio 8.5:1.5, $\overline{Mw}$ = 150,000) | |
| 2,2'-Azobis-(2,4-dimethylvaleronitrile) (V-65, product of Wako-junyaku Kogyo K.K.) | 10 g |
| Phthalocyanine blue | 10 g |
| Divinylbenzene | 1 g |

A toner was prepared in the same manner as in Example 1I except that the monomer system with the above composition was used. The toner obtained had a number average size of 8.7 μm, a number distribution in which particles of 6.35 μm or less comprised 17% and a volume distribution in which particles of 20.2 μm or more comprised 1% (Coulter counter, aperture 100μ).

Image formation was effected according to the method in which development was carried out with a toner containing no magnetic material without mixing with carrier particles by conveying the toner to a developing section where it was to be held on the toner bearing member by electrostatic force. As the result, good images were obtained. In successive image formation, images were formed stably for 20,000 sheets. This toner had no problem of brocking at 50° C., and it showed good fixing characteristics in the system applied with silicone oil of a fixing device at 160° C. without the problem of off-set. Also, under high humidity of 80% RH at 32° C., good images were obtained.

The toner subjected to no coupling treatment gave somewhat inferior image quality.

EXAMPLE 5I

The procedure upto suspension polymerization was repeated in the same manner as in Example 1I. To the suspension obtained was added sodium hydroxide in the amount of 1% by weight of the polymer particles. After being stirred at room temperature for six hours, the suspension was filtered and washed with water to remove the most of the silica. Then, after 200 g of 1 wt. % aqueous solution of SH-6076 was added into the suspension, the suspension was stirred at room temperature for an hour, filtered, washed with water and dried to obtain a toner. The toner obtained had a number average size of 8.95 μm, a number distribution in which particles of 6.35 μm or less comprised 18% and a volume distribution in which particles of 20.2 μm or more comprised 1% (Coulter counter, aperture 100μ).

The toner was also mixed with iron powder carrier EFV 250/400 at a level of the toner content of 10 wt.%. The triboelectric charge of the mixture was measured to be −18.4 μC/g. By use of this developing agent, development was conducted by means of a copying machine (NP-5500). As the result, good images were obtained. In successive image formation for 50,000 sheets, good images were also stably obtained. Moreover, when this toner was subjected to the blocking test at 50° C., no blocking occurred at all after one week or longer. Under high humidity of 80% RH at 32° C., good images were formed.

EXAMPLE 1J

The same procedure up to polymerization as in Example 1H was repeated. Thereafter, 3 g of γ-chloropropyl trimethoxysilane (SH-6076, produced by Toray Silicone) was added in the suspension, and then the suspension was stirred at room temperature so as to react the coupling agent with the dispersant, washed with water, filtered and dried to obtain a toner.

The toner obtained had a number average size of 9.4 μm, a number distribution in which particles of 6.35 μm or less comprised 18% and a volume distribution in which particles of 20.2 μm or more comprised 1% (Coulter counter, aperture 100μ). The properties of the toner were as given in the following table.

| Sample | Quality of image | | Blocking at 50° C. three days | Fixing characteristics | | Free flowing property of toner |
|---|---|---|---|---|---|---|
| | Initial stage | Successive 10,000 sheets | | Fixing temp. | Off-set at fixing temp. | |
| Example 1 | 1 | 1 | 1 | 150° C. | 1 | 1 |

A developing agent was prepared by mixing the toner with an iron powder carrier (EFV 250/400 produced by Nihon Teppun K.K.) at a level of the toner content of 10 wt.%. By use of this developing agent, image formation was effected by reversal development using a copying machine NP-5500. The fixing characteristic was tested by means of the fixing device applied with no releasing agent such as silicone oil of the copying machine PC-10. Free flowing property was estimated by visually observing the actual flowing condition in the developing device.

Under high humidity of 90% at 32° C., the treated toner involved no problem but the untreated toner gave somewhat inferior image quality.

EXAMPLE 2J

| Styrene monomer | 180 g |
|---|---|
| Butyl acrylate monomer | 20 g |
| Styrene methacrylic acid copolymer | 10 g |
| (monomer ratio 9:1, $\overline{Mw}$ = 100,000) | |
| Paraffin wax 150° F. | 8 g |
| (product of Nihon Seiro K.K.) | |
| Azobisisobutyronitrile | 10 g |
| BL-30 (product of Titan Kogyo K.K.) | 60 g |
| ASA-30 (product of Mitsubishi Kasei K.K.) | 1 g |

A polymer was prepared in the same manner as in Example 1J except that the monomer system with the above composition was used. This polymer was subjected to coupling treatment with 5 g of SH-6076 to obtain a toner.

The toner obtained had a number average size of 8.7 μm, a number distribution in which particles of 6.35 μm or less comprised 20% and a volume distribution in which particles of 20.2 μm or more comprised 5% (Coulter counter, aperture 100μ).

The properties of the toner are as given in the following table.

The toner not subjected to coupling with SH-6076 gave somewhat inferior image quality under high temperature and high humidity.

EXAMPLE 3J

| Styrene monomer | 200 g |
|---|---|
| Copolymer of styrene and 2-hydroxy-ethyl methacrylate | 10 g |
| (monomer ratio 9:1, $\overline{Mw}$ = 50,000) | |
| Paraffin wax 155° F. | 10 g |
| (product of Nihon Seiro K.K.) | |
| Divinylbenzene | 1 g |
| Phthalocyanine green | 10 g |

The procedure was repeated to polymerization in the same manner as in Example 1J except that the monomer system with the above composition was used. To the resultant polymer was added 1 g of isopropyl triisostearoyl titanate (KR-TTS, produced by Ajinomoto K.K.). After stirring the mixture at room temperature for two hours, the polymer was filtered and dried to obtain a toner.

The toner obtained had a number average size of 8.4 μm, a number distribution in which particles of 6.35 μm or less comprised 17% and a volume distribution in which particles of 20.2 μm or more comprised 0% (Coulter counter, aperture 100μ).

The properties of the toner are given in the following table.

| Sample | Quality of images | | | Blocking at 50° C., three days | Fixing characteristics | | |
|---|---|---|---|---|---|---|---|
| | Initial stage | Successive 10,000 sheets | Under high humidity | | Fixing temp. | Off-set at fixing temp. | Off-set at 200° C. |
| Example 3 | 1 | 1 | 1 | 1 | 150° C. | 1 | 1 |

Image formation was effected according to the method in which development was carried out with a toner containing no magnetic material without mixing with carrier particles by conveying the toner to a developing section where it was to be held on the toner bearing member by electrostatic force.

Fixing characteristic was tested by use of the heat roller fixing device of the copying machine PC-10.

| Sample | Qualtiy of images | | Blocking at 50° C. three days | Fixing characteristics | | Free flowing property of toner | Under high humidity |
|---|---|---|---|---|---|---|---|
| | Initial stage | Successive 2,000 sheets | | Fixing temp. | Off-set at fixing temp. | | |
| Example 2 | 1 | 1 | 1 | 155 C. | 1 | 1 | 1 |

Image formation was effected by means of the copying machine NP-400RE, and fixing characteristic was also tested by the fixing device of the same machine.

EXAMPLE 4J

| Styrene monomer | 100 g |
|---|---|
| Styrene-maleic anhydride copolymer | 10 g |
| (monomer ratio 8.5:1.5, $\overline{Mw}$ = 150,000) | |

| | | |
|---|---|---|
| Paraffin wax 155° F. | 100 g | |
| (product by Nihon Seiro K.K.) | | |
| 2,2'-Azobis-(2,4-dimethylvalero- | 10 g | |
| nitrile | | |
| (V-65 product of Wako-junyaku Kogyo K.K.) | | |
| Phthalocyanine blue | 10 g | |
| Divinylbenzene | 10 g | |

A toner was prepared in the same manner as in Example 1J except that the monomer system with the above composition was used. The toner obtained had a number average size of 8.5 μm, a number distribution in which particles of 6.35 μm or less comprised 18% and a volume distribution in which particles of 20.2 μm or more comprised 0% (Coulter counter, aperture 100μ).

The properties of the toner are given in the following table.

| Sample | Quality of images Initial stage | Quality of images Successive 2,000 sheets | Blocking at 50° C. three days | Fixing characteristics Linear pressure 15 kg | Fixing characteristics Off-set at fixing temp. | Free flowing property of toner | Quality of image under high humidity |
|---|---|---|---|---|---|---|---|
| Example 4 | 1 | 1 | 2 | 1 | 1 | 1 | 1 |

The developing method used was the same as in Example 3J. Fixing characteristic was tested by use of a pressure fixing device equipped with a rigid material roller.

The toner untreated on its surface with the silane coupling agent was somewhat bad in image quality under high temperature and high humidity.

EXAMPLE 1K

The same procedure up to polymerization as in Example 1G was repeated. Thereafter, sodium hydroxide in an amount of 4% by weight of the polymer was thrown into the polymerizer. Then, while being heated at 40° C., the mixture was stirred for six hours at a stirring speed such that no sedimentation of particles might occur. Then the mixture was filtered, washed sufficiently with water and dried to produce a toner. The toner obtained had a number average size of 9.05 μm, a number distribution in which particles of 6.35 μm or less comprised 17% and a volume distribution in which particles of 20.2 μm or more comprised 1% (Coulter counter, aperture 100μ).

The toner was also mixed with iron powder carrier EFV 250/400 at a level of the toner content of 10 weight %. The triboelectric charge of the mixture was measured to be $-15.6$ μC/g. By use of this developing agent, reversal development was conducted by means of a copying machine (NP-5500). As the result, good images were obtained. In the successive image formation for 50,000 sheets, good images were also obtained stably. Moreover, when this toner was subjected to the blocking test at 50° C., no blocking occurred at all after one week or longer.

In image formation under high humidity of 90% RH at 32° C. The toner of this Example had no problem, but the toner not treated with sodium hydroxide gave somewhat bad image quality, with increase of fog to some extent.

EXAMPLE 2K

| | |
|---|---|
| Styrene monomer | 180 g |
| Butyl acrylate monomer | 20 g |
| Styrene-methacrylic acid copolymer | 10 g |
| (monomer ratio 9:1, $\overline{Mw}$ :100.000) | |
| Azobisisobutyronitrile | 10 g |
| BL-250 | 120 g |
| (produced by Titan Kogyo K.K.) | |
| ASA-30 | 1 g |
| (produced by Mitsubishi Kasei K.K.) | |

A polymer was prepared by suspension polymerization in the same way as in Example 1K except that the monomer system with the composition described above was employed. The polymer obtained was stirred for three hours in an aqueous solution containing potassium carbonate in an amount of 6% by weight of the polymer. Then, the polymer was filtered, washed with water and dried to obtain a toner.

The toner obtained had a number average size of 8.5 μm, a number distribution in which particles of 6.35 μm or less comprised 20% and a volume distribution in which particles of 20.2 μm or more comprised 0% (Coulter counter, aperture 100μ). This toner was charged in a copying machine (NP400RE), and image formation was effected. As the result, good images were obtained. Further, in successive image formation for 2000 sheets, images were also good. In the blocking test at 50° C., no blocking occurred for one week or longer.

The toner prepared by direct filtration and drying without the treatment with potassium carbonate, when provided for copying by means of the copying machine NP-400RE, gave somewhat inferior image quality under high temperature and high humidity.

The results of evaluation under highly humid environment of 80% at 32° C. are as follows.

| | Images |
|---|---|
| Treated with sodium hydroxide | 1 |
| Not treated with sodium hydroxide | 2 |

EXAMPLE 3K

| | |
|---|---|
| Styrene monomer | 200 g |
| Copolymer of styrene and 2-hydroxyethyl methacrylate | 10 g |
| (monomer ratio 9:1, $\overline{Mw}$ :150,000) | |
| Azobisisobutyronitrile | 10 g |
| Phthalocyanine green | 10 g |

The monomer system with the composition described above was subjected to polymerization in the same way as in Example 1K to produce a toner. The toner obtained had a number average size of 8.3 μm, a number distribution in which particles of 6.35 μm or less comprised 18% and a volume distribution in which particles of 20.2 μm or more comprised 0% (Coulter counter, aperture 100μ). By use of this toner, image formation was effected in the same manner as in Example 1K. The triboelectric charge of the toner was −14.2 μC/g, and the images were good. In successive image formations images without fog were formed stably for 50,000 sheets. Also, there was no problem in the blocking test at 50° C. The toner prepared without treatment with sodium hydroxide gave slightly marked fog under high temperature and high humidity. The results of evaluation of images formed under high humidity of 80% at 35° C. are as follows.

|  | Images |
| --- | --- |
| Treated with sodium hydroxide | 1 |
| Not treated with sodium hydroxide | 2 |

EXAMPLE 4K

| Styrene monomer | 200 g |
| --- | --- |
| Styrene-maleic anhydride copolymer (monomer ratio 8.5:1.5, $\overline{Mw}$:150.000) | 10 g |
| Azobisisobutyrovaleronitrile (V-65, product of Wako-junyaku Kogyo K.K.) | 10 g |
| Phthalocyanine blue | 10 g |
| Divinylbenzene | 1 g |

A toner was prepared in the same manner as in Example 1K except that the monomer system with the above composition was used. The toner obtained had a number average size of 8.7 μm, a number distribution in which particles of 6.35 μm or less comprised 17% and a volume distribution in which particles of 20.2 μm or more comprised 1% (Coulter counter, sperture 100μ).

Image formation was effected according to the method in which development was carried out with a toner containing no magnetic material without mixing with carrier particles by conveying the toner to a developing section where it was to be held on the toner bearing member by electrostatic force. As the result, good images were obtained. In successive image formation, images were formed stably for 20,000 sheets. This toner had no problem in the blocking test at 50° C. and gave good results in the test of fixing characteristic without any problem of off-set in the system applied with silicone oil at 160° C. of a fixing device.

The toner prepared by direct filtration and drying of the suspended polymer without treatment with sodium hydroxide gave somewhat inferior image quality under high temperature and high humidity.

The toner were evaluated under high humidity of 80% at 35° C. The results are shown below.

|  | Images |
| --- | --- |
| Treated with sodium hydroxide | 1 |
| Not treated with sodium hydroxide | 2 |

EXAMPLE 1L

The same procedure up to polymerization as in Example 1H was repeated. To the resultant suspension was added 8 g of sodium hydroxide, and then the suspension was stirred at room temperature for six hours. After filtration, the polymer was washed with water and dried to obtain a toner.

The toner obtained had a number average size of 9.1 μm, a number distribution in which particles of 6.35 μm or less comprised 18% and a volume distribution in which particles of 20.2 μm or more comprised 1% (Coulter counter, aperture 100μ).

A developing agent was prepared by mixing the toner with an iron powder carrier (EFV 250/400 produced by Nihon Teppun) at a level of the toner content of 10 weight %. By use of this developing agent, image formation was effected using a copying machine NP-5500. The fixing was effected by means of a fixing device applied with no releasing agent such as silicone oil of the copying machine PC-10. Free flowing property was evaluated by visually observing the actual flowing condition in the developing device.

Under high humidity of 90% at 32.5° C., the treated toner had no problem, but the untreated toner gave somewhat bad image quality with slight increase of fog.

EXAMPLE 2L

| Styrene monomer | 180 g |
| --- | --- |
| Butyl acrylate monomer | 20 g |
| Styrene-methacrylic acid copolymer (monomer ratio 9:1, $\overline{Mw}$:100,000) | 10 g |
| Paraffin wax 150° F. (product of Nihon Seiro K.K.) | 8 g |
| Azobisisobutyronitrile | 10 g |
| BL-250 (product of Titan Kogyo K.K.) | 60 g |
| ASA-30 (product of Mitsubishi Kasei K.K.) | 1 g |

A polymer was prepared in the same manner as in Example 1L except that the monomer system with the composition described above was used. The polymer was treated with 8% potassium hydroxide to produce a toner.

The toner obtained had a number average size of 8.7 μm, a number distribution in which particles of 6.35 μm or less comprised 20% and a volume distribution in which particles of 20.2 μm or more comprised 0% (Coulter counter, aperture 100μ). As a comparative example, a toner was prepared by repeating the same procedure as above except that treatment with potassium hydroxide was omitted.

The performances of these toners under high humidity conditions (80%, 30° C.) were evaluated. The results are shown below.

| Sample | Quality of Images |
| --- | --- |
| Example 2L | 1 |
| Without treatment with sodium hydroxide | 2 |

Image formation was effected by use of the copying machine (NP-400RE), and fixing was effected using the fixing device of the same machine.

EXAMPLE 3L

| Styrene monomer | 200 g |
| --- | --- |
| Copolymer of styrene and 2-hydroxyethyl methacrylate (monomer ratio 9:1, $\overline{Mw}$ = 150,000) | 10 g |
| Azobisisobutyronitrile | 10 g |
| Paraffin wax 155° F. (product of Nihon Seiro K.K.) | 10 g |

-continued

| | |
|---|---|
| Divinyl benzene | 1 g |
| Phthalocyanine green | 10 g |

A toner was prepared in the same manner as in Example 1L except that the monomer system with the above composition was used. The polymer was treated with sodium hydroxide in an amount of 10% by weight of the polymer to obtain a toner.

The toner obtained had a number average size of 8.4 μm, a number distribution in which particles of 6.35 μm or less comprised 17% and a volume distribution in which particles of 20.2 μm or more comprised 0% (Coulter counter, aperture 100μ). The performances of the toners under high humidity, (80%, 35° C.) was as follows.

| Sample | Quality of images |
|---|---|
| Example 3L | 1 |
| Without treatment with sodium hydroxide | 2 |

Image formation was effected according to the method in which development was carried out with a toner containing no magnetic material without mixing with carrier particles by conveying the toner to a developing section where it was to be held on the toner bearing member by electrostatic force.

Fixing was effected by use of the heat roller fixing device of the copying machine (NP-450RE).

EXAMPLE 4L

| | |
|---|---|
| Styrene monomer | 100 g |
| Styrene-maleic anhydride copolymer | 10 g |
| (monomer ratio 9:1, $\overline{Mw}$:150,000) | |
| Paraffin wax 155° F. | 100 g |
| (product of Nihon Seiro) | |
| V-65 | 10 g |
| (product of Wako-junyaku Kogyo K.K.) | |
| Phthalocyanine blue | 10 g |
| Divinylbenzene | 1 g |

The same procedure to polymerization as in Example 1L was repeated except that the monomer system with the above composition was employed. The polymer obtained was treated with potassium hydroxide in an amount of 12% of the polymer to produce a toner.

The toner obtained had a number average size of 8.5 μm, a number distribution in which particles of 6.35 μm or more comprised 18% and a volume distribution in which particles of 20.2 μm or more comprised 1%.

The performances of the toners under high humidity conditions (80%, 32.5° C.) were as follows.

| Example | Quality of Images |
|---|---|
| Example 4L | 1 |
| Without treatment with sodium hydroxide | 2 |

The developing method used was the same as in Example 3L. Fixing was effected by means of a pressure fixing device equipped with a rigid material roller.

What is claimed is:

1. A polymerization process for producing a pseudo-capsule toner, comprising sequentially:

(a) mixing a polymerizable unsaturated monomer, a polar polymer selected from the group consisting of a cationic polymer and an anionic polymer, a colorant or a magnetic powder, and a polymerization initiator to obtain a monomer system containing said unsaturated monomer, said colorant or said magnetic powder, said polymerization initiator, and said polar polymer dissolved in said unsaturated monomer;

(b) dispersing the obtained monomer system in an aqueous dispersion medium containing a dispersant having a charging polarity opposite to that of said polar polymer to form suspended particles of said monomer system in which said polymer collects at the surface of the suspended particles through electrostatic interaction with said dispersant; and (c) suspension polymerizing said monomer system in said aqueous dispersion medium to obtain particles containing a polymer obtained from said monomer, said polar polymer and said colorant or said magnetic powder;

wherein the resulting particles have a pseudo-capsule structure in which said polar polymer is concentrated at the surface of each of said particles for use as a toner.

2. A process according to claim 1, wherein the monomer system is dispersed in the aqueous dispersion medium containing 0.1 to 10% by weight of the dispersant having a charging polarity opposite to that of the polar polymer.

3. A process according to claim 2, wherein the monomer system is polymerized by suspension polymerization at a temperature not lower than 50° C.

4. A process according to claim 1, wherein the monomer system comprises 100 parts by weight of the polymerizable unsaturated monomer, 0.5 to 50 parts by weight of the polar polymer, 0.1 to 10% by weight of the polymerization initiator and 2 to 10 parts by weight of the colorant based on 100 parts by weight of the total of the monomer and the polar polymer.

5. A process according to claim 1, wherein the monomer system comprises 100 parts by weight of the polymerizable unsaturated monomer, 0.5 to 50 parts by weight of the polymer, 0.1 to 10% by weight of the polymerization initiator and 15 to 100 parts by weight of the magnetic powder based on 100 parts by weight of the total of the monomer and the polar polymer.

6. A process according to claim 1, wherein the polar polymer is a cationic polymer having a cationic group and the dispersant is an anionic dispersant having an anionic charge in the aqueous dispersion medium.

7. A process according to claim 6, wherein the dispersant is an anionic inorganic dispersant having an anionic charge in the aqueous dispersion medium.

8. A process according to claim 7, wherein the anionic inorganic dispersant is colloidal silica.

9. A process according to claim 6, wherein the dispersant is an anionic organic dispersant selected from the group consisting of partially saponified polyvinyl acetate and partially saponified product of copolymer of vinyl acetate.

10. A process according to claim 6, wherein the cationic polymer is a homopolymer of cationic monomer or a copolymer of a cationic monomer and a copolymerizable monomer therewith in which said cationic monomer is a nitrogen containing monomer.

11. A process according to claim 10, wherein the cationic polymer has a molecular weight of 5000 to 500,000.

12. A process according to claim 11, wherein the copolymerizable monomer is styrene, styrene derivative, ethylenically unsaturated monoolefin or alpha-methylene aliphatic monocarboxylic acid ester.

13. A process according to claim 1, wherein the polar polymer is an anionic polymer having an anionic group and the dispersant is a cationic dispersant having a cationic charge in the aqueous dispersion medium.

14. A process according to claim 13, wherein the cationic dispersant is a cationic inorganic dispersant having a cationic charge in the aqueous dispersion medium.

15. A process according to claim 14, wherein the cationic dispersant is aluminum oxide or positively chargable hydrophilic colloidal silica.

16. A process according to claim 14, wherein the anionic polymer is a polymer having a molecular weight of 5000 to 500,000 and having hydroxyl group, carboxyl group, sulfonic acid group, phosphoxy group or acid anhydride.

17. A process according to claim 16, wherein the anionic polymer is a homopolymer of anionic monomer or a copolymer of an anionic monomer and a copolymerizable monomer therewith.

18. A process according to claim 17, wherein the copolymerizable monomer is styrene, monoolefin or alpha-methylene aliphatic monocarboxylic acid ester.

19. A process according to claim 1, wherein the monomer system further contains a hydrocarbon compound selected from the group consisting of paraffin having 6 or more carbon atoms and a polyolefin having 6 or more carbon atoms.

20. A process according to claim 1, wherein the particles obtained by the suspension polymerization are further treated with a silane coupling agent or a titanate coupling agent to remove hygroscopicity thereof.

21. A process according to claim 1, wherein the particles obtained by the suspension polymerization are further treated with an alkali to eliminate the dispersant from the particles.

22. A pseudo-capsule toner obtained by:
  (a) mixing a polymerizable unsaturated monomer, a polar polymer selected from the group consisting of a cationic polymer and an anionic polymer, a colorant or a magnetic powder and a polymerization initiator to obtain a monomer system containing said unsaturated monomer, said colorant or magnetic powder, said polymerization initiator and said polar polymer dissolved in said unsaturated monomer;
  (b) dispersing the obtained monomer system in an aqueous dispersion medium containing a dispersant having a charging polarity opposite to that of said polar polymer therein to form suspended particles of said monomer system in which said polar polymer collects at the surface of the suspended particles through electrostatic interaction with said dispersant; and
  (c) suspension polymerizing said monomer system in said aqueous dispersion medium to obtain particles containing a polymer obtained from said monomer, said polar polymer and said colorant or said magnetic powder, wherein the resulting particles have a pseudo-capsule structure in which said polar polymer is concentrated at the surface of each of said particles for use as a toner.

* * * * *